United States Patent
Yokoyama et al.

(10) Patent No.: US 11,905,570 B2
(45) Date of Patent: Feb. 20, 2024

(54) HOT DIP GALVANIZED STEEL SHEET AND METHOD FOR PRODUCING SAME

(71) Applicant: NIPPON STEEL CORPORATION, Tokyo (JP)

(72) Inventors: Takafumi Yokoyama, Tokyo (JP); Hiroyuki Kawata, Tokyo (JP); Kunio Hayashi, Tokyo (JP); Yuji Yamaguchi, Tokyo (JP); Satoshi Uchida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 235 days.

(21) Appl. No.: 17/427,870

(22) PCT Filed: Feb. 6, 2020

(86) PCT No.: PCT/JP2020/004651
§ 371 (c)(1),
(2) Date: Aug. 2, 2021

(87) PCT Pub. No.: WO2020/162561
PCT Pub. Date: Aug. 13, 2020

(65) Prior Publication Data
US 2022/0119908 A1    Apr. 21, 2022

(30) Foreign Application Priority Data
Feb. 6, 2019    (JP) .................. 2019-020067

(51) Int. Cl.
*C21D 9/46* (2006.01)
*C22C 38/00* (2006.01)
(Continued)

(52) U.S. Cl.
CPC .............. *C21D 9/46* (2013.01); *B32B 15/013* (2013.01); *C21D 8/0226* (2013.01);
(Continued)

(58) Field of Classification Search
CPC ................ C21D 9/46; C21D 2211/005; C21D 2211/008; C21D 2211/001; C23C 2/0224;
(Continued)

(56) References Cited

U.S. PATENT DOCUMENTS

2008/0000555 A1    1/2008    Nonaka et al.
2009/0238713 A1    9/2009    Kinugasa et al.
(Continued)

FOREIGN PATENT DOCUMENTS

CN    103842542 A    6/2014
JP    5-195149 A    8/1993
(Continued)

*Primary Examiner* — Katherine A Christy
(74) *Attorney, Agent, or Firm* — Birch, Stewart, Kolasch & Birch, LLP

(57) ABSTRACT

A hot dip galvanized steel sheet includes a base steel sheet and a hot dip galvanized layer on at least one surface of the base metal steel sheet, wherein the base steel sheet has a predetermined chemical composition, and contains, by volume fraction, ferrite: 0% to 50%, retained austenite: 0% to 30%, tempered martensite: 5% or more, fresh martensite: 0% to 10%, and pearlite and cementite in total: 0% to 5%, when there are remaining structures, the remaining structures consist of bainite, a concentration of B atoms at prior austenite grain boundaries is 2.0 atm % or more, and an average effective crystal grain size is 7.0 μm or less, and a method for producing the same.

1 Claim, 2 Drawing Sheets

(51) Int. Cl.

| | | |
|---|---|---|
| *C22C 38/02* | (2006.01) | |
| *C22C 38/04* | (2006.01) | |
| *C22C 38/06* | (2006.01) | |
| *C22C 38/60* | (2006.01) | |
| *C23C 2/28* | (2006.01) | |
| *C23C 2/40* | (2006.01) | |
| *B32B 15/01* | (2006.01) | |
| *C22C 38/12* | (2006.01) | |
| *C22C 38/14* | (2006.01) | |
| *C22C 38/16* | (2006.01) | |
| *C22C 38/18* | (2006.01) | |
| *C23C 2/02* | (2006.01) | |
| *C21D 8/02* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C23C 2/06* | (2006.01) | |

(52) U.S. Cl.
CPC .......... *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/18* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C23C 2/02* (2013.01); *C23C 2/0224* (2022.08); *C23C 2/06* (2013.01); *C23C 2/28* (2013.01); *C23C 2/40* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01)

(58) Field of Classification Search
CPC ........... C23C 2/28; C23C 2/40; C22C 38/001; C22C 38/005; C22C 38/008; C22C 38/02; C22C 38/04; C22C 38/06; C22C 38/12; C22C 38/14; C22C 38/16; C22C 38/18; C22C 38/28; C22C 38/40; C22C 38/60; B32B 15/013
USPC ........................................................ 428/659
See application file for complete search history.

(56) References Cited

U.S. PATENT DOCUMENTS

| | | |
|---|---|---|
| 2013/0048151 A1 | 2/2013 | Kawamura et al. |
| 2013/0133786 A1 | 5/2013 | Matsuda et al. |
| 2014/0227555 A1 | 8/2014 | Kawata et al. |
| 2014/0242416 A1 | 8/2014 | Matsuda et al. |
| 2015/0203947 A1 | 7/2015 | Hasegawa et al. |
| 2018/0002800 A1 | 1/2018 | Hasegawa et al. |
| 2018/0030564 A1 | 2/2018 | Hasegawa et al. |
| 2018/0105908 A1 | 4/2018 | Hayashi et al. |
| 2019/0169729 A1 | 6/2019 | Yokoyama et al. |
| 2019/0330721 A1 | 10/2019 | Hayashi et al. |
| 2020/0131597 A1 | 4/2020 | Takashima et al. |
| 2021/0207234 A1 | 7/2021 | Takashima et al. |

FOREIGN PATENT DOCUMENTS

| | | |
|---|---|---|
| JP | 6-145891 A | 5/1994 |
| JP | 9-111398 A | 4/1997 |
| JP | 10-1740 A | 1/1998 |
| JP | 2006-104532 A | 4/2006 |
| JP | 2007-197819 A | 8/2007 |
| JP | 2011-184757 A | 9/2011 |
| JP | 2013-144830 A | 7/2013 |
| JP | 2016-50343 A | 4/2016 |
| JP | 2017-48412 A | 3/2017 |
| WO | WO 2011/105385 A1 | 9/2011 |
| WO | WO 2013/051238 A1 | 4/2013 |
| WO | WO 2014/020640 A1 | 2/2014 |
| WO | WO 2016/113788 A1 | 7/2016 |
| WO | WO 2016/113789 A1 | 7/2016 |
| WO | WO 2016/171237 A1 | 10/2016 |
| WO | WO 2017/179372 A1 | 10/2017 |
| WO | WO 2018/011978 A1 | 1/2018 |
| WO | WO 2018/055695 A1 | 3/2018 |
| WO | WO 2019/003641 A1 | 1/2019 |

1. USING R5 mm PUNCH FOR 180° BENDING
2. SPRING BACK
3. FASTENING BOLT TO APPLY PREDETERMINED STRESS

HOT DIP GALVANIZED STEEL SHEET AND METHOD FOR PRODUCING SAME

FIELD

The present invention relates to a hot dip galvanized steel sheet and a method for producing the same, mainly relates to a high strength hot dip galvanized steel sheet to be worked into various shapes by press forming etc., as a steel sheet for automobile use and a method for producing the same.

BACKGROUND

In recent years, improvement of the fuel efficiency of automobiles has been sought from the viewpoint of control of hot house gas emissions accompanying the campaign against global warming. Application of high strength steel sheet for lightening the weight of car bodies and securing collision safety has been increasingly expanding. In particular, recently, the need for ultrahigh strength steel sheet with a tensile strength of 980 MPa or more has been increasingly rising. Further, high strength hot dip galvanized steel sheet which is hot dip galvanized on its surface is being sought for portions in car bodies where rust prevention is demanded.

Hot dip galvanized steel sheet used for auto parts requires not only strength, but also press formability, weldability, and various other types of workability necessary for forming parts. Specifically, from the viewpoint of press formability, excellent elongation (total elongation in tensile test: El) and stretch flangeability (hole expansion rate: λ) are required from steel sheet.

In general, press formability deteriorates along with the higher strength of steel sheet. As means for achieving both higher strength and press formability of steel, TRIP (transformation induced plasticity) steel sheet utilizing transformation induced plasticity of retained austenite is known.

PTLs 1 to 3 disclose art relating to high strength TRIP steel sheet controlled in fractions of structural constituents to predetermined ranges and improved in elongation and hole expansion rates.

Furthermore, TRIP type high strength hot dip galvanized steel sheet is disclosed in several literature.

Normally, to produce hot dip galvanized steel sheet in a continuous annealing furnace, it is necessary to heat the steel sheet to the reverse transformation temperature region (>Ac1) and soak it, then in the middle of the process for cooling down to room temperature, dip it in a 460° C. or so hot dip galvanizing bath. Alternatively, after heating and soaking, then cooling down to room temperature, it is necessary to reheat the steel sheet to the hot dip galvanizing bath temperature and dip it in the bath. Furthermore, usually, to produce hot dip galvannealed steel sheet, it is necessary to perform alloying treatment after dipping the steel sheet in the coating bath, then reheat the steel sheet to a 460° C. or more temperature region. For example, PTL 4 describes that the steel sheet is heated to Ac1 or more, is then rapidly cooled down to the martensite transformation start temperature (Ms) or less, is then reheated to the bainite transformation temperature region and held at the temperature region to stabilize the austenite (austemper it), and is then reheated to the coating bath temperature or alloying treatment temperature for galvannealing. However, with such a production method, since the martensite and bainite is excessively tempered in the coating and alloying step, there was the problem that the material quality became poor.

PTLs 5 to 9 disclose a method for producing hot dip galvanized steel sheet comprising cooling the steel sheet after the coating and alloying and reheating it to temper the martensite.

On the other hand, if applying an ultra high strength steel sheet having a tensile strength of more than 980 MPa as a member for an automobile, it is necessary to not only secure press formability of course and also solve the problem of hydrogen embrittlement cracking of the steel sheet (also called "delayed fracture"). "Hydrogen embrittlement fracture" is the phenomenon where a steel member on which a high stress acts in the situation of use suddenly fractures due to the hydrogen penetrating the steel from the environment. In general, hydrogen embrittlement cracking occurs more easily the more the strength of the steel sheet rises. This is believed to be because the residual stress after shaping increases the higher the strength of the steel sheet. This susceptibility to hydrogen embrittlement cracking is called the hydrogen embrittlement resistance.

Up to now as well, several attempts to improve the hydrogen embrittlement resistance of steel sheet have been made. Examples of such studies are shown below.

PTLs 10 and 11 disclose a method for producing ultra high strength steel sheet making the steel structure mainly a martensite structure by heating cold rolled steel sheet having a predetermined chemical composition to the Ac3 point or more, quenching it, and tempering it, and describe that these ultra high strength steel sheets have excellent delayed fracture resistance.

PTL 12 discloses high strength cold rolled steel sheet having a chemical composition containing Cu, Cr, Nb, Ni, etc., in trace amounts, having a steel structure rendered a mainly bainite structure, and having a tensile strength of 120 kgf/mm$^2$ or more, and describes that such high strength cold rolled steel sheet is excellent in delayed fracture resistance.

PTL 13 discloses a method for producing cold rolled steel sheet having a structure inside the steel rendered a mainly tempered martensite structure while softened at the surface layer and having a 1270 MPa or more tensile strength by decarburizing annealing steel sheet having a predetermined chemical composition, then heating it to the Ar3 point or more, quenching, and tempering it, and describes that such cold rolled steel sheet is excellent in bendability and delayed fracture resistance.

PTL 14 discloses high strength thin-gage steel sheet utilizing the hydrogen trap action of retained austenite by controlling the amount and dispersion mode of retained austenite contained in the steel structure, and describes that this high strength thin-gage steel sheet is excellent in hydrogen embrittlement resistance.

PTL 15 describes that adjusting the volume fractions of the soft phases (ferrite) and the hard phases (martensite and retained austenite) acting as the sources of formation of voids to cause the formation of the hard intermediate phases of tempered martensite or bainite (hardnesses between the soft phases of ferrite and the hard phases of martensite) and further making the crystal grains finer makes it possible to secure strength and hole expandability while containing soft ferrite to a certain degree, and containing cementite in the structure of the steel sheet to cause the formation of hydrogen trap sites makes it possible to secure strength, and obtain elongation, delayed fracture resistance (hydrogen embrittlement resistance) and hole expandability.

CITATIONS LIST

Patent Literature

[PTL 1] WO 2013/051238
[PTL 2] Japanese Unexamined Patent Publication No. 2006-104532

[PTL 3] Japanese Unexamined Patent Publication No. 2011-184757
[PTL 4] WO 2014/020640
[PTL 5] Japanese Unexamined Patent Publication No. 2013-144830
[PTL 6] WO 2016/113789
[PTL 7] WO 2016/113788
[PTL 8] WO 2016/171237
[PTL 9] Japanese Unexamined Patent Publication No. 2017-48412
[PTL 10] Japanese Unexamined Patent Publication No. 10-001740
[PTL 11] Japanese Unexamined Patent Publication No. 9-111398
[PTL 12] Japanese Unexamined Patent Publication No. 6-145891
[PTL 13] WO 2011/105385
[PTL 14] Japanese Unexamined Patent Publication No. 2007-197819
[PTL 15] WO 2017/179372

SUMMARY

Technical Problem

In steel sheet for automobiles, if considering the usage, the hydrogen embrittlement resistance after introduction of plastic strain due to press forming has to be excellent. However, in the prior art, the improvement of the hydrogen embrittlement resistance after introduction of strain has not necessarily been sufficiently studied. For this reason, there is still room for improvement of the properties of hot dip galvanized steel sheet, in particular hot dip galvanized steel sheet used for members for automobiles.

Therefore, an object of the present invention is to provide hot dip galvanized steel sheet excellent in press formability and hydrogen embrittlement resistance after plastic working and having a tensile strength of 980 MPa or more and a method for producing the same.

Solution to Problem

The inventors engaged in intensive studies for solving this problem and as a result obtained the following findings:

(i) In the continuous hot dip galvanization heat treatment step, martensite is formed by cooling down to the Ms or less after coating or coating and alloying. Further, after that, the steel may be reheated and held isothermally to suitably temper the martensite and, in the case of steel sheet containing retained austenite, further stabilize the retained austenite. By such heat treatment, the martensite is no longer excessively tempered by the coating or coating and alloying, and therefore the balance of strength and ductility is improved.

(ii) Hydrogen embrittlement cracking proceeds by cracks advancing along the crystal grain boundaries. Therefore, stabilization of the crystal grain boundaries is effective for improvement of the hydrogen embrittlement resistance. Therefore, the inventors looked at boron (B) which has the effect of stabilization of austenite grain boundaries and thought of increasing the segregation and concentration of boron at the austenite grain boundaries. Specifically, they discovered that by holding the steel sheet isothermally in the 480 to 600° C. or so temperature region where boron easily segregates at the austenite grain boundaries after the soaking step and cooling step in continuous hot dip galvanization heat treatment, the segregation and concentration of boron at the grain boundaries rise. However, if performing such treatment after coating or after martensite transformation, the powdering property of the coating layer deteriorates and the balance of strength and ductility deteriorates due to the martensite being excessively tempered. Therefore, the isothermal holding operation has to be performed before the coating treatment.

(iii) To improve the effect of grain boundary segregation of boron more, in the process leading up to the continuous hot dip galvanization heat treatment, the precipitation and coarsening of borides has to be suppressed and the boron has to be present in a solid solution state. Specifically, the hot rolling and cooling conditions after hot rolling are limited to suppress the precipitation and coarsening of borides in the hot rolling step. In addition, the hydrogen embrittlement resistance is improved more by performing continuous hot dip galvanization heat treatment satisfying the above (i) and (ii).

The present invention was realized based on the above findings and specifically is as follows:

(1) A hot dip galvanized steel sheet comprising a base steel sheet and a hot dip galvanized layer on at least one surface of the base steel sheet, wherein the base steel sheet has a chemical composition comprising, by mass %,
C: 0.050% to 0.350%,
Si: 0.10% to 2.50%,
Mn: 1.00% to 3.50%,
P: 0.050% or less,
S: 0.0100% or less,
Al: 0.001% to 1.500%,
N: 0.0100% or less,
O: 0.0100% or less,
Ti: 0.005% to 0.200%,
B: 0.0005% to 0.0100%,
V: 0% to 1.00%,
Nb: 0% to 0.100%,
Cr: 0% to 2.00%,
Ni: 0% to 1.00%,
Cu: 0% to 1.00%,
Co: 0% to 1.00%,
Mo: 0% to 1.00%,
W: 0% to 1.00%,
Sn: 0% to 1.00%,
Sb: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM other than Ce and La: 0% to 0.0100% and
a balance of Fe and impurities,
a steel microstructure at a range of ⅛ thickness to ⅜ thickness centered about a position of ¼ thickness from a surface of the base steel sheet contains, by volume fraction,
ferrite: 0% to 50%,
retained austenite: 0% to 30%,
tempered martensite: 5% or more,
fresh martensite: 0% to 10%, and
pearlite and cementite in total: 0% to 5%,
when there are remaining structures, the remaining structures consist of bainite, a concentration of B atoms at prior austenite grain boundaries is 2.0 atm % or more, and an average effective crystal grain size is 7.0 μm or less.

(2) The hot dip galvanized steel sheet according to (1) wherein the steel microstructure further contains, by volume fraction, retained austenite: 6% to 30%.

(3) A method for producing the hot dip galvanized steel sheet according to (1) or (2), comprising (A) a hot rolling step comprising finish rolling a slab having the chemical composition according to the above (1), then coiling it up, wherein the hot rolling step satisfies the conditions of the following (A1) to (A4):

(A1) a time during which the slab dwells at the temperature $T_B$ or less from extracting the slab to the finish rolling inlet side is 300 seconds or less,

[Mathematical 1]

$$T_B = \frac{13{,}970}{5.24 - \mathrm{Log}_{10}([B] \cdot [N])} - 273.15 (°C) \quad (1)$$

(where [B] and [N] respectively represent mass % of boron (B) and nitrogen (N)), (A2) in the finish rolling, the finish rolling inlet side temperature is 900 to 1050° C., the finish rolling exit temperature is 850° C. to 1000° C. and a total rolling reduction is 70 to 95%, (A3) in cooling of the steel sheet after the finish rolling, the average cooling rate from the finish rolling exit temperature to 800° C. is V° C./s or more,

[Mathematical 2]

$$V = \exp(2.2 \times 10^5 \cdot [B] \cdot [N]) [° \mathrm{C./s}] \quad (2)$$

(where [B] and [N] respectively represent mass % of boron (B) and nitrogen (N)), and (A4) a coiling temperature is 450 to 680° C., and (B) a hot dip galvanizing step comprising heating the obtained steel sheet to first soak it, first cooling then second soaking the first soaked steel sheet, dipping the second soaked steel sheet in a hot dip galvanizing bath, second cooling the coated steel sheet, and heating the second cooled steel sheet then third soaking it, wherein the hot dip galvanizing step satisfies the conditions of the following (B1) to (B7):

(B1) in the heating of the steel sheet before the first soaking, an average heating rate from 650° C. to a maximum heating temperature of Ac1+30° C. or more and 950° C. or less is 0.5° C./s to 10.0° C./s, (B2) the steel sheet is held at the maximum heating temperature for 1 second to 1000 seconds (first soaking), (B3) an average cooling rate in a temperature range of 700 to 600° C. at the first cooling is 10 to 100° C./s, (B4) the first cooled steel sheet is held in a range of 480 to 600° C. for 80 seconds to 500 seconds (second soaking), (B5) when dipping the second soaked steel sheet in a hot dip galvanizing bath, then alloying it, the alloying treatment is performed in a range of 460 to 600° C., (B6) the second cooling is performed down to Ms-50° C. or less, and (B7) the second cooled steel sheet is heated to a temperature region of 200 to 420° C., then held in the temperature region for 5 to 1000 seconds (third soaking).

Advantageous Effects of Invention

According to the present invention, it is possible to obtain hot dip galvanized steel sheet excellent in press formability, specifically ductility and hole expandability and further hydrogen embrittlement resistance after introduction of plastic strain.

DESCRIPTION OF EMBODIMENTS

<Hot Dip Galvanized Steel Sheet>

Figure 1:
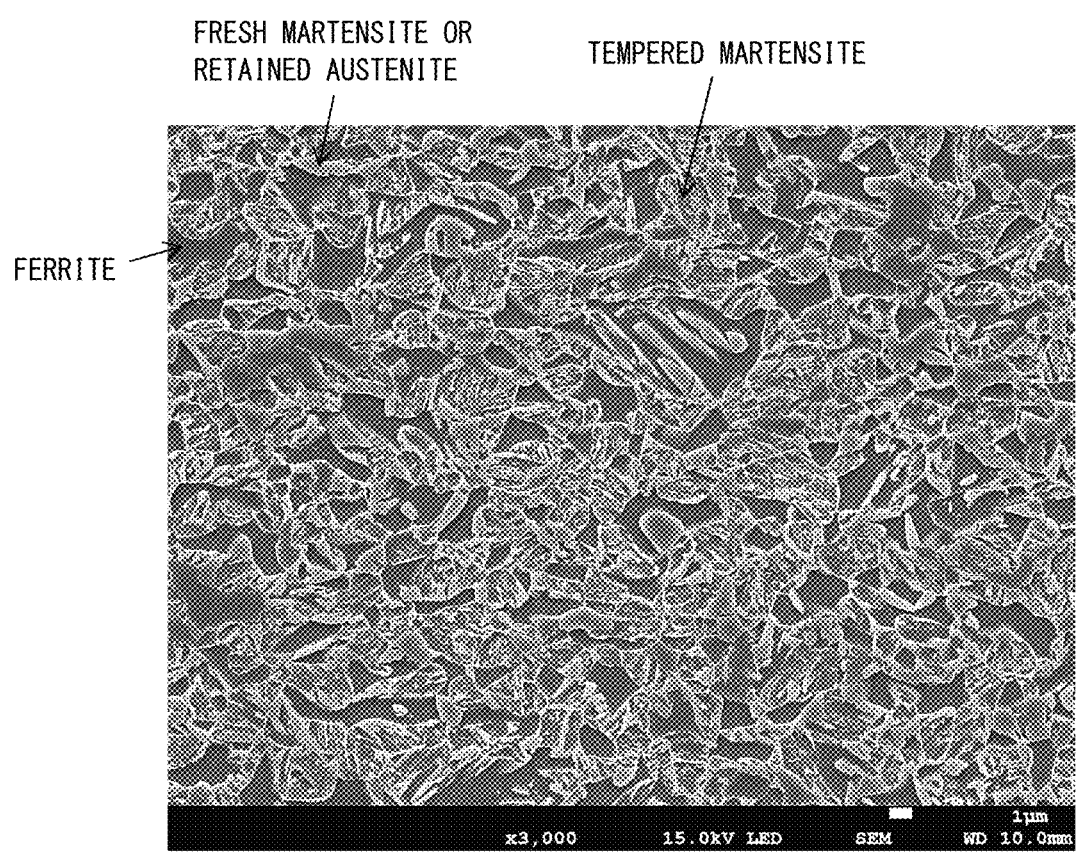
FIG. 1 shows a reference view of an SEM secondary electron image.

The hot dip galvanized steel sheet according to the embodiment of the present invention comprises a base steel sheet and a hot dip galvanized layer on at least one surface of the base steel sheet, wherein the base steel sheet has a chemical composition comprising, by mass %, C: 0.050% to 0.350%,
Si: 0.10% to 2.50%,
Mn: 1.00% to 3.50%,
P: 0.050% or less,
S: 0.0100% or less,
Al: 0.001% to 1.500%,
N: 0.0100% or less,
O: 0.0100% or less,
Ti: 0.005% to 0.200%,
B: 0.0005% to 0.0100%,
V: 0% to 1.00%,
Nb: 0% to 0.100%,
Cr: 0% to 2.00%,
Ni: 0% to 1.00%,
Cu: 0% to 1.00%,
Co: 0% to 1.00%,
Mo: 0% to 1.00%,
W: 0% to 1.00%,
Sn: 0% to 1.00%,
Sb: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM other than Ce and La: 0% to 0.0100% and
a balance of Fe and impurities, a steel microstructure at a range of ⅛ thickness to ⅜ thickness centered about a position of ¼ thickness from a surface of the base steel sheet contains, by volume fraction, ferrite: 0% to 50%,
retained austenite: 0% to 30%,
tempered martensite: 5% or more,
fresh martensite: 0% to 10%, and
pearlite and cementite in total: 0% to 5%, when there are remaining structures, the remaining structures consist of bainite, a concentration of B atoms at prior austenite grain boundaries is 2.0 atm % or more, and an average effective crystal grain size is 7.0 μm or less.

[Chemical Composition]

First, the reasons for limitation of the chemical composition of the base steel sheet according to the embodiment of the present invention (below, also simply referred to as the "steel sheet") as described above will be explained. In this Description, the "%" used in prescribing the chemical composition are all "mass %" unless otherwise indicated. Further, in this Description, "to" when showing the ranges of numerical values unless otherwise indicated will be used in the sense including the lower limit values and upper limit values of the numerical values described before and after it.

[C: 0.050% to 0.350%]

C is an element essential for securing the steel sheet strength. If less than 0.050%, the required high strength cannot be obtained, and therefore the content of C is 0.050% or more. The content of C may be 0.070% or more, 0.085% or more, or 0.100% or more as well. On the other hand, if more than 0.350%, the workability or weldability falls, and therefore the content of C is 0.350% or less. The content of C may be 0.340% or less, 0.320% or less, or 0.300% or less as well.

[Si: 0.10% to 2.50%]

Si is an element suppressing formation of iron carbides and contributing to improvement of strength and shapeability, but excessive addition causes the weldability of the steel sheet to deteriorate. Therefore, the content is 0.10 to 2.50%. The content of Si may be 0.20% or more, 0.30% or more, 0.40% or more, or 0.50% or more as well and/or may be 2.20% or less, 2.00% or less, or 1.90% or less as well.

[Mn: 1.00% to 3.50%]

Mn (manganese) is a powerful austenite stabilizing element and an element effective for increasing the strength of the steel sheet. Excessive addition causes the weldability or low temperature toughness to deteriorate. Therefore, the content is 1.00 to 3.50%. The content of Mn may be 1.10% or more, 1.30% or more, or 1.50% or more as well and/or may be 3.30% or less, 3.10% or less, or 3.00% or less as well.

[P: 0.050% or Less]

P (phosphorus) is a solution strengthening element and an element effective for increasing the strength of the steel sheet. Excessive addition causes the weldability and toughness to deteriorate. Therefore, the content of P is limited to 0.050% or less. Preferably it is 0.045% or less, 0.035% or less, or 0.020% or less. However, since extreme reduction of the content of P would result in high dephosphorizing costs, from the viewpoint of economics, a lower limit of 0.001% is preferable.

[S: 0.0100% or Less]

S (sulfur) is an element contained as an impurity and forms MnS in steel to cause the toughness and hole expandability to deteriorate. Therefore, the content of S is restricted to 0.0100% or less as a range where the toughness and hole expandability do not remarkably deteriorate. Preferably it is 0.0050% or less, 0.0040% or less, or 0.0030% or less. However, since extreme reduction of the content of S would result in high desulfurizing costs, from the viewpoint of economics, a lower limit of 0.0001% is preferable.

[Al: 0.001% to 1.500%]

Al (aluminum) is added in at least 0.001% for deoxidation of the steel. However, even if excessively adding it, not only does the effect become saturated and is a rise in cost invited, but also the transformation temperature of the steel is raised and the load at the time of hot rolling is increased. Therefore, an amount of Al of 1.500% is the upper limit. Preferably it is 1.200% or less, 1.000% or less, or 0.800% or less.

[N: 0.0100% or less]

N (nitrogen) is an element contained as an impurity. If its content is more than 0.0100%, it forms coarse nitrides in the steel and causes deterioration of the bendability and hole expandability. Therefore, the content of N is limited to 0.0100% or less. Preferably it is 0.0080% or less, 0.0060% or less, or 0.0050% or less. However, since extreme reduction of the content of N would result in high denitriding costs, from the viewpoint of economics, a lower limit of 0.0001% is preferable.

[O: 0.0100% or less]

O (oxygen) is an element contained as an impurity. If its content is more than 0.0100%, it forms coarse oxides in the steel and causes deterioration of the bendability and hole expandability. Therefore, the content of 0 is limited to 0.0100% or less. Preferably it is 0.0080% or less, 0.0060% or less, or 0.0050% or less. However, from the viewpoint of the producing costs, a lower limit of 0.0001% is preferable.

[Ti: 0.005% to 0.200%]

Ti (titanium) fixes the N (nitrogen) present as an impurity in the steel as TiN and is added to keep the B (boron) from precipitating as nitrides. To obtain the above effect, at least 0.005% must be added. On the other hand, if excessively added, not only does the effect become saturated, but also coarse titanium carbide (TiC) is formed and the ductility or toughness of the steel sheet deteriorates. For this reason, the upper limit of the addition amount is 0.200%. The content of Ti may be 0.008% or more, 0.010% or more, or 0.013% or more and/or may be 0.150% or less, 0.120% or less, or 0.100% or less.

[B: 0.0005% to 0.0100%]

B (boron) segregates at the prior austenite grain boundaries and causes a drop in the energy of the prior austenite grain boundaries thereby improving the hardenability of the steel sheet. Furthermore, in the present invention, B atoms segregate at the prior austenite grain boundaries and raise the peel strength of the prior austenite grain boundaries, and therefore improve the hydrogen embrittlement resistance. To obtain the above effect, at least 0.0005% or more must be added. On the other hand, if excessively added, not only does the effect become saturated, but also borides are formed in the steel and the hardenability of the steel sheet is lowered. For this reason, the upper limit of the addition amount is 0.0100%. The content of B may be 0.0006% or more, 0.0008% or more, or 0.0010% or more and/or may be 0.0060% or less, 0.0040% or less, or 0.0035% or less.

The basic chemical composition of the base steel sheet according to the embodiment of the present invention is as explained above. The base steel sheet may further contain the following elements according to need.

[V: 0% to 1.00%, Nb: 0% to 0.100%, Cr: 0% to 2.00%, Ni: 0% to 1.00%, Cu: 0% to 1.00%, Co: 0% to 1.00%, Mo: 0% to 1.00%, W: 0% to 1.00%, Sn: 0% to 1.00%, and Sb: 0% to 1.00%]

V (vanadium), Nb (niobium), Cr (chromium), Ni (nickel), Cu (copper), Co (cobalt), Mo (molybdenum), W (tungsten), Sn (tin), and Sb (antimony) are all elements effective for raising the strength of steel sheet. For this reason, one or more of these elements may be added in accordance with need. However, if excessively adding these elements, the effect becomes saturated and in particular an increase in cost is invited. Therefore, the contents are V: 0% to 1.00%, Nb: 0% to 0.100%, Cr: 0% to 2.00%, Ni: 0% to 1.00%, Cu: 0% to 1.00%, Co: 0% to 1.00%, Mo: 0% to 1.00%, W: 0% to 1.00%, Sn: 0% to 1.00%, Sb: 0% to 1.00%. The elements may also be 0.005% or more or 0.010% or more.

[Ca: 0% to 0.0100%, Mg: 0% to 0.0100%, Ce: 0% to 0.0100%, Zr: 0% to 0.0100%, La: 0% to 0.0100%, Hf: 0% to 0.0100%, Bi: 0% to 0.0100%, and REM other than Ce and La: 0% to 0.0100%]

Ca (calcium), Mg (magnesium), Ce (cerium), Zr (zirconium), La (lanthanum), Hf (hafnium), and REM (rare earth elements) other than Ce and La are elements contributing to microdispersion of inclusions in the steel. Bi (bismuth) is an element lightening the microsegregation of Mn, Si, and other substitution type alloying elements in the steel. Since these respectively contribute to improvement of the workability of steel sheet, one or more of these elements may be added in accordance with need. However, excessive addition causes deterioration of the ductility. Therefore, a content of 0.0100% is the upper limit. Further, the elements may be 0.0005% or more or 0.0010% or more as well.

In the base steel sheet according to the embodiment of the present invention, the balance other than the above elements is comprised of Fe and impurities. "Impurities" are constituents entering due to various factors in the producing process, first and foremost the raw materials such as the ore and scrap, when industrially producing the base steel sheet and encompass all constituents not intentionally added to the base steel sheet according to the embodiment of the present invention. Further, "impurities" encompass all elements other than the constituents explained above contained in the base steel sheet in levels where the actions and effects distinctive to those elements do not affect the properties of the hot dip galvanized steel sheet according to the embodiment of the present invention.

[Steel Structures Inside Steel Sheet]

Next, the reasons for limitation of the internal structure of the base steel sheet according to the embodiment of the present invention will be explained.

[Ferrite: 0 to 50%]

Ferrite is a soft structure excellent in ductility. It may be included to improve the elongation of steel sheet in accordance with the demanded strength or ductility. However, if excessively contained, it becomes difficult to secure the desired steel sheet strength. Therefore, the content is a volume fraction of 50% as the upper limit and may be 45% or less, 40% or less, or 35% or less. The content of ferrite may be a volume fraction of 0%. For example, it may be 3% or more, 5% or more, or 10% or more.

[Tempered Martensite: 5% or More]

Tempered martensite is a high strength tough structure and is an essential metallic structure in the present invention. To balance the strength, ductility, and hole expandability at a high level, it is included in a volume fraction of at least 5% or more. Preferably, it is a volume fraction of 10% or more. It may be 15% or more or 20% or more as well. For example, the content of the tempered martensite may be a volume fraction of 96% or less, 85% or less, 80% or less, or 70% or less.

[Fresh Martensite: 0 to 10%]

In the present invention, fresh martensite means martensite which is not tempered, i.e., martensite not containing carbides. This fresh martensite is a brittle structure, so becomes a starting point of fracture at the time of plastic deformation and causes deterioration of the local ductility of the steel sheet. Therefore, the content is a volume fraction of 0 to 10%. More preferably it is 0 to 8% or 0 to 5%. The content of fresh martensite may be a volume fraction of 1% or more or 2% or more.

[Retained Austenite: 0% to 30%]

Retained austenite improves the ductility of steel sheet due to the TRIP effect of transformation into martensite due to work induced transformation during deformation of steel sheet. On the other hand, to obtain a large amount of retained austenite, C and other alloying elements must be included in large amounts. For this reason, the upper limit value of the retained austenite is a volume fraction of 30%. It may be 25% or less or 20% or less as well. However, if desiring to improve the ductility of the steel sheet, the content is preferably a volume fraction of 6% or more, 8% or more, or 10% or more. Further, if the content of the retained austenite is 6% or more, the content of Si in the base steel sheet is preferably, by mass %, 0.50% or more.

[Pearlite and Cementite in Total: 0 to 5%]

Pearlite includes hard coarse cementite and forms a starting point of fracture at the time of plastic deformation, so causes the local ductility of the steel sheet to deteriorate. Therefore, the content, together with the cementite, is a volume fraction of 0 to 5%. It may also be 0 to 3% or 0 to 2%.

The remaining structures besides the above structures may be 0%, but if there are any present, they are bainite. The remaining bainite structures may be upper bainite or lower bainite or may be mixed structures of the same.

[Concentration of B Atoms at Prior Austenite Grain Boundaries: 2.0 Atm % or More]

The base steel sheet according to an embodiment of the present invention has a concentration of B atoms at the prior austenite grain boundaries of 2.0 atm % or more. In the present invention, the B atoms segregate at the prior austenite grain boundaries to thereby raise the peel strength of the prior austenite grain boundaries and improve the hydrogen embrittlement resistance. If less than 2.0 atm %, the effect of improvement of the hydrogen embrittlement resistance is not sufficiently obtained. The concentration of B atoms at the prior austenite grain boundaries may be 2.5 atm % or more or 3.0 atm % or more.

[Average Effective Crystal Grain Size: 7.0 µm or Less]

The base steel sheet according to an embodiment of the present invention has an average effective crystal grain size of 7.0 µm or less. In the present invention, the "average effective crystal grain size" means the value calculated when defining a grain having a difference in orientation from adjoining grains of 15 degrees or more of one crystal grain. In addition to the improvement of the peel strength of the prior austenite grain boundaries by the B atoms, it is possible to improve the hydrogen embrittlement resistance by reducing the average effective crystal grain size. If the average effective crystal grain size is more than 7.0 µm, the effect of improvement of the hydrogen embrittlement resistance is not sufficiently obtained. The average effective crystal grain size may be 6.0 µm or less, 5.5 µm or less, or 5.0 µm or less as well.

The fractions of the steel structures of the hot dip galvanized steel sheet are evaluated by the SEM-EBSD method (electron backscatter diffraction method) and SEM secondary electron image observation.

First, a sample is taken from the cross-section of thickness of the steel sheet parallel to the rolling direction so that the cross-section of thickness at the center position in the width direction becomes the observed surface. The observed surface is machine polished and finished to a mirror surface, then electrolytically polished. Next, in one or more observation fields at a range of ⅛ thickness to ⅜ thickness centered about ¼ thickness from the surface of the base steel sheet at the observed surface, a total area of $2.0 \times 10^{-9}$ m² or more is analyzed for crystal structures and orientations by the SEM-EBSD method. The data obtained by the EBSD method is analyzed using "OIM Analysis 6.0" made by TSL. Further, the distance between evaluation points (steps) is 0.03 to 0.20 μm. Regions judged to be FCC iron from the results of observation are deemed retained austenite. Further, boundaries with differences in crystal orientation of 15 degrees or more are deemed grain boundaries to obtain a crystal grain boundary map.

Next, the same sample as that observed by EBSD is corroded by Nital and observed by secondary electron image for the same fields as observation by EBSD. Since observing the same fields as the time of EBSD measurement, Vickers indentations and other visual marks may be provided in advance. From the obtained secondary electron image, the area ratios of the ferrite, retained austenite, bainite, tempered martensite, fresh martensite, and pearlite are respectively measured and the results deemed the volume fractions. Regions having lower structures in the grains and having several variants of cementite, more specifically two or more variants, precipitating are judged to be tempered martensite (for example, see reference drawing of FIG. 1). Regions where cementite precipitates in lamellar form are judged to be pearlite (or pearlite and cementite in total). Regions which are small in brightness and in which no lower structures are observed are judged to be ferrite (for example, see reference drawing of FIG. 1). Regions which are large in brightness and in which lower structures are not revealed by etching are judged to be fresh martensite and retained austenite (for example, see reference drawing of FIG. 1). Regions not corresponding to any of the above regions are judged to be bainite. The volume ratios of the same are calculated by the point counting method and used as the volume ratios of the structures. The volume ratio of the fresh martensite can be found by subtracting the volume ratio of retained austenite found by X-ray diffraction.

The volume ratio of retained austenite is measured by the X-ray diffraction method. At a range of ⅛ thickness to ⅜ thickness centered about ¼ thickness from the surface of the base steel sheet, a surface parallel to the sheet surface is polished to a mirror finish and measured for area ratio of FCC iron by the X-ray diffraction method. This is used as the volume fraction of the retained austenite.

In the present invention, the concentration of B atoms at the prior austenite grain boundaries is found by the STEM-EELS method. Specifically, for example, it is found by the method disclosed in METALLURGICAL AND MATERIALS TRANSACTIONS A: vol. 45A, p. 1877 to 1888. First, a sample is taken from the cross-section of thickness of the steel sheet parallel to the rolling direction so that the cross-section of thickness at the center position in the width direction becomes the observed surface. The observed surface is machine polished and finished to a mirror surface, then electrolytically polished. Next, in one or more observation fields at a range of ⅛ thickness to ⅜ thickness centered about ¼ thickness from the surface of the base steel sheet at the observed surface, a total area of $2.0 \times 10^{-9}$ m² or more is analyzed for crystal structures and orientations by the SEM-EBSD method to identify the prior austenite grain boundaries. Next, the region including the prior austenite grain boundaries is extracted by FIB in the SEM. After that, Ar ion milling etc., is used to reduce the thickness down to about 70 nm. The electron energy loss spectrum (EELS) is obtained along a line traversing the prior austenite grain boundaries by aberration spectrum STEM from the test piece reduced in thickness. The scan steps at the time of line analysis is preferably 0.1 nm or so.

The "average effective crystal grain size" in the present invention is determined using the value found by the above EBSD analysis. Specifically, the value calculated by the following formula using a boundary of a difference in orientation of 15 degrees or more as a grain boundary is the average effective crystal grain size. In the formula, N is the number of crystal grains included in the region for evaluation of the average effective crystal grain size, Ai is the area of the i-th (i=1, 2, . . . , N) grain, and di is the circle equivalent diameter of the i-th crystal grain. These data is easily found by EBSD analysis.

[Mathematical 3]
$$D = \frac{\sum_{i=1}^{N} Ai \times di}{\sum_{i=1}^{N} Ai}$$

(Hot Dip Galvanized Layer)

The base steel sheet according to the embodiment of the present invention has a hot dip galvanized layer on at least one surface, preferably on both surfaces. This coating layer may be a hot dip galvanized layer or hot dip galvannealed layer having any composition known to persons skilled in the art and may include Al and other additive elements in addition to Zn. Further, the amount of deposition of the coating layer is not particularly limited and may be a general amount of deposition.

<Method for Producing Hot Dip Galvanized Steel Sheet>

Next, the method for producing the hot dip galvanized steel sheet according to the embodiment of the present invention will be explained. The following explanation is meant to illustrate the characteristic method for producing the hot dip galvanized steel sheet according to the embodiment of the present invention and is not meant to limit the hot dip galvanized steel sheet to one produced by the production method explained below.

The method for producing the hot dip galvanized steel sheet comprises (A) a hot rolling step comprising finish rolling a slab having the same chemical composition as the chemical composition explained above relating to the base steel sheet, then coiling it up, wherein the hot rolling step satisfies the conditions of the following (A1) to (A4):

(A1) a time during which the slab dwells at the temperature $T_B$ or less from extracting the slab to the finish rolling inlet side is 300 seconds or less,

[Mathematical 4]
$$T_B = \frac{13,970}{5.24 - \text{Log}_{10}([B] \cdot [N])} - 273.15 (°C) \quad (1)$$

(where [B] and [N] respectively represent mass % of boron (B) and nitrogen (N)), (A2) in the finish rolling, the finish rolling inlet side temperature is 900 to 1050° C., the finish rolling exit temperature is 850° C. to 1000° C. and a total rolling reduction is 70 to 95%, (A3) in cooling of the steel sheet after the finish rolling, the average cooling rate from the finish rolling exit temperature to 800° C. is V° C./s or more,

[Mathematical 5]

$$V = \exp(2.2 \times 10^5 \cdot [B] \cdot [N])[° C./s] \quad (2)$$

(where [B] and [N] respectively represent mass % of boron (B) and nitrogen (N)), (A4) a coiling temperature is 450 to 680° C., and (B) a hot dip galvanizing step comprising heating the obtained steel sheet to first soak it, first cooling then second soaking the first soaked steel sheet, dipping the second soaked steel sheet in a hot dip galvanizing bath, second cooling the coated steel sheet, and heating the second cooled steel sheet then third soaking it, wherein the hot dip galvanizing step satisfies the conditions of the following (B1) to (B7):

(B1) in the heating of the steel sheet before the first soaking, an average heating rate from 650° C. to a maximum heating temperature of Ac1+30° C. or more and 950° C. or less is 0.5° C./s to 10.0° C./s, (B2) the steel sheet is held at the maximum heating temperature for 1 second to 1000 seconds (first soaking), (B3) an average cooling rate in a temperature range of 700 to 600° C. at the first cooling is 10 to 100° C./s, (B4) the first cooled steel sheet is held in a range of 480 to 600° C. for 80 seconds to 500 seconds (second soaking), (B5) when dipping the second soaked steel sheet in a hot dip galvanizing bath, then alloying it, the alloying treatment is performed in a range of 460 to 600° C., (B6) the second cooling is performed down to Ms-50° C. or less, and (B7) the second cooled steel sheet is heated to a temperature region of 200 to 420° C., then held in the temperature region for 5 to 1000 seconds (third soaking).

Below, the method for producing hot dip galvanized steel sheet will be explained in detail.

[(A) Hot Rolling Step]

First, in the hot rolling step, a slab having the same chemical composition as the chemical composition explained above relating to the base steel sheet is heated before hot rolling. The heating temperature of the slab is not particularly limited, but for sufficient dissolution of the borides, carbides, etc., generally 1150° C. or more is preferable. The steel slab used is preferably produced by the continuous casting method from the viewpoint of producing ability, but may also be produced by the ingot making method or thin slab casting method.

[Time where Slab Dwells at Temperature $T_B$ or Less from Extraction of Slab to Finish Rolling Inlet Side: 300 Seconds or Less]

In the present method, the time where the slab extracted from the casting facility dwells at the temperature $T_B$ or less expressed by the following formula (1) until the finish rolling inlet side is controlled to 300 seconds or less. $T_B$ is the temperature where a thermodynamic drive force at which boron nitride (BN) is precipitated is generated. When steel dwells at a $T_B$ or less temperature for a long time, the BN starts to precipitate, sufficient solid solution B can no longer be obtained, and the amount of segregation of B at the austenite grain boundaries in the final product decreases. Therefore, the time dwelling at $T_B$ or less is limited to 300 seconds or less. For example, it may be 200 seconds or less or 150 seconds or less.

[Mathematical 6]

$$T_B = \frac{13{,}970}{5.24 - \mathrm{Log}_{10}([B] \cdot [N])} - 273.15 (°C) \quad (1)$$

(where [B] and [N] respectively represent mass % of boron (B) and nitrogen (N)).

[Rough Rolling]

In this method, for example, the heated slab may be rough rolled before the finish rolling so as to adjust the sheet thickness etc. Such rough rolling is not particularly limited, it is preferable to perform it to give a total rolling reduction at 1050° C. or more of 60% or more. If the total rolling reduction is less than 60%, since the recrystallization during hot rolling becomes insufficient, sometimes this leads to unevenness of the structure of the hot rolled sheet. The above total rolling reduction may, for example, be 90% or less.

[Finish Rolling Inlet Side Temperature: 900 to 1050° C., Finish Rolling Exit Side Temperature: 850° C. to 1000° C., and Total Rolling Reduction: 70 to 95%]

The finish rolling is performed in a range satisfying the conditions of a finish rolling inlet side temperature of 900 to 1050° C., a finish rolling exit side temperature of 850° C. to 1000° C., and a total rolling reduction of 70 to 95%. If the finish rolling inlet side temperature falls below 900° C., the finish rolling exit side temperature falls below 850° C., or the total rolling reduction exceeds 95%, the hot rolled steel sheet develops texture, so sometimes anisotropy appears in the final finished product sheet. On the other hand, if the finish rolling inlet side temperature rises above 1050° C., the finish rolling exit side temperature rises above 1000° C., or the total rolling reduction falls below 70%, the hot rolled steel sheet becomes coarser in crystal grain size sometimes leading to coarsening of the final finished product sheet structure and resulting in the average effective crystal grain size not satisfying a predetermined range. For example, the finish rolling inlet side temperature may be 950° C. or more. The finish rolling exit side temperature may be 900° C. or more. The total rolling reduction may be 75% or more or 80% or more.

[Average Cooling Rate from Finish Rolling Exit Side Temperature to 800° C.: V° C./s or More]

To keep boron from precipitating as nitrides after the finish rolling, the obtained steel sheet is cooled by an average cooling rate of V° C./s or more in the range from the finish rolling exit side temperature to 800° C. If the cooling rate falls below V° C./s, the boron present in a solid solution state due to precipitation of BN decreases, so the amount of segregation of boron at the austenite grain boundaries in the final product decreases. Here, V is expressed by the following formula (2).

[Mathematical 7]

$$V = \exp(2.2 \times 10^5 \cdot [B] \cdot [N])[° C./s] \quad (2)$$

In the formula, [B] and [N] respectively represent mass % of boron (B) and nitrogen (N). Further, in the present invention, the "average cooling rate from finish rolling exit side temperature to 800° C." means a value obtained by dividing the difference of the finish rolling exit side temperature and 800° C. by the elapsed time from the finish rolling exit side temperature to 800° C.

[Coiling Temperature: 450 to 680° C.]

The coiling temperature is 450 to 680° C. If the coiling temperature falls below 450° C., the strength of the hot rolled sheet becomes excessive and sometimes the cold rolling ductility is impaired. On the other hand, if the coiling temperature exceeds 680° C., the cementite coarsens and undissolved cementite remains, so sometimes the workability is impaired. Further, coarse borides precipitate in the hot rolled steel sheet and the boron present in a solid solution state decreases, so the amount of segregation of boron at the austenite grain boundaries at the final product decreases. The coiling temperature may be 470° C. or more and/or may be 650° C. or less.

In the present method, the obtained hot rolled steel sheet (hot rolled coil) may be pickled or otherwise treated as required. The hot rolled coil may be pickled by any ordinary method. Further, the hot rolled coil may be skin pass rolled to correct its shape and improve its pickling ability.

[Cold Rolling Step]

In this method, after the hot rolling and/or pickling, the steel sheet may be heat treated as is by a continuous hot dip galvanization line or may be cold rolled, then heat treated on a continuous hot dip galvanization line. If performing cold rolling, the cold rolling reduction is preferably 25% or more or 30% or more. On the other hand, since excessive rolling reduction results in an excessive rolling force and leads to increases in load of the cold rolling mill, the upper limit is preferably 75% or 70%.

[(B) Hot Dip Galvanization Step]

[Average Heating Rate from 650° C. to Maximum Heating Temperature of Ac1+30° C. or More and 950° C. or Less: 0.5 to 10.0° C./s]

In this method, after the hot rolling step, the obtained steel sheet is coated in a hot dip galvanization step. In the hot dip galvanization step, first, the steel sheet is heated and subjected to first soaking treatment. At the time of heating the steel sheet, the average heating rate from 650° C. to the maximum heating temperature of Ac1+30° C. or more and 950° C. or less is limited to 0.5 to 10.0° C./s. If the heating rate is more than 10.0° C./s, the recrystallization of ferrite does not sufficiently proceed and sometimes the elongation of the steel sheet becomes poor. On the other hand, if the average heating rate falls below 0.5° C./s, the austenite becomes coarse, so sometimes the finally obtained steel structures become coarse. This average heating rate may be 1.0° C./or more and/or may be 8.0° C./s or less or 5.0° C./s or less. In the present invention, the "average heating rate" means the value obtained by dividing the difference between 650° C. and the maximum heating temperature by the elapsed time from 650° C. to the maximum heating temperature.

[First Soaking Treatment: Holding at Maximum Heating Temperature of Ac1+30° C. or More and 950° C. or Less for 1 Second to 1000 Seconds]

To cause sufficient austenite transformation to proceed, the steel sheet is heated to at least Ac1+30° C. or more and held at that temperature (maximum heating temperature) as soaking treatment. However, if excessively raising the heating temperature, not only is deterioration of the toughness due to coarsening of the austenite grain size invited, but also damage to the annealing facilities is led to. For this reason, the upper limit is 950° C., preferably 900° C. If the soaking time is short, austenite transformation does not sufficiently proceed, so the time is at least 1 second or more. Preferably it is 30 seconds or more or 60 seconds or more. On the other hand, if the soaking time is too long, the productivity is damaged, so the upper limit is 1000 seconds, preferably 500 seconds. During soaking, the steel sheet does not necessarily have to be held at a constant temperature. It may also fluctuate within a range satisfying the above conditions. The "holding" in the first soaking treatment and the later explained second soaking treatment and third soaking treatment means maintaining the temperature within a range of a predetermined temperature±20° C., preferably ±10° C., in a range not exceeding the upper limit value and lower limit value prescribed in the soaking treatments. Therefore, for example, a heating or cooling operation which gradually heats or gradually cools whereby the temperature fluctuates by more than 40° C., preferably 20° C., with the temperature ranges prescribed in the soaking treatments are not included in the first, second, and third soaking treatments according to the embodiment of the present invention.

[First Cooling: Average Cooling Rate in Temperature Range of 700 to 600° C.: 10 to 100° C./s]

After holding at the maximum heating temperature, the steel sheet is cooled by the first cooling. The cooling stop temperature is 480° C. to 600° C. of the following second soaking treatment temperature. The average cooling rate in a temperature range of 700° C. to 600° C. is 10 to 100° C./s. If the average cooling rate is less than 10° C./s, sometimes the desired ferrite fraction cannot be obtained. The average cooling rate may be 15° C./s or more or 20° C./s or more. Further, the average cooling rate may also be 80° C./s or less or 60° C./s or less. Further, in the present invention, "the average cooling rate in a temperature range of 700 to 600° C." means the value obtained by dividing the temperature difference between 700° C. and 600° C., i.e., 100° C., by the elapsed time from 700° C. to 600° C.

[Second Soaking Treatment: Holding in Range of 480° C. to 600° C. for 80 to 500 Seconds]

Second soaking treatment holding the steel sheet in a range of 480° C. to 600° C. for 80 to 500 seconds is performed for making the concentration of segregation of the B atoms in the austenite grain boundaries rise more. If the temperature of the second soaking treatment falls below 480° C. or becomes higher than 600° or if the holding time falls below 80 seconds, the segregation of the B atoms to the austenite grain boundaries does not sufficiently proceed. On the other hand, if the holding time becomes more than 500 seconds, since bainite transformation will excessively proceed, the metal structures according to the embodiment of the present invention will not be able to be obtained. The temperature of the second soaking treatment may be 500° C. or more and/or may be 570° C. or less. Further, the holding time may be 100 seconds or more and/or may be 400 seconds or less. In relation to this, even if simply suitably performing the second soaking treatment, if not suitably securing sufficient solid solution B in the hot rolling step, the amount of segregation of B at the austenite grain boundaries in the final product decreases. Therefore, in the method for producing the hot dip galvanized steel sheet according to an embodiment of the present invention, to make the amount of segregation of B to the austenite grain boundaries in the final product increase, it is important to satisfy the conditions of (A1), (A3), and (A4) explained above in the hot rolling step while suitably performing the second soaking treatment in the hot dip galvanization step.

In the present method, to produce the hot dip galvanized steel sheet according to an embodiment of the present invention, after the second soaking treatment, predetermined coating treatment has to be performed, but if the second soaking treatment were performed after dipping in the coating bath, sometimes the powdering resistance of the coated layer would remarkably deteriorate. This is because if performing heat treatment after dipping in a coating bath at 480° C. or more for 80 seconds or more, the alloying reaction between the coating and steel sheet excessively proceeds and the structure inside the coating film changes from the θ phases excellent in ductility to the Γ phases poor in ductility.

After the second soaking treatment, the steel sheet is dipped in a hot dip galvanizing bath. The steel sheet temperature at this time has little effect on the performance of the steel sheet, but if the difference between the steel sheet temperature and the coating bath temperature is too large, since the coating bath temperature will change and sometimes hinder operation, provision of a step for cooling the steel sheet to a range of the coating bath temperature −20° C. to the coating bath temperature +20° C. is desirable. The hot dip galvanization may be performed by an ordinary method. For example, the coating bath temperature may be 440 to 460° C. and the dipping time may be 5 seconds or less. The coating bath is preferably a coating bath containing Al in 0.08 to 0.2%, but as impurities, Fe, Si, Mg, Mn, Cr, Ti, and Pb may also be contained. Further, controlling the basis weight of the coating by gas wiping or another known method is preferable. The basis weight is preferably 25 to 75 g/m$^2$ per side.

[Alloying Treatment: 460 to 600° C.]

The hot dip galvanized steel sheet formed with the hot dip galvanized layer may be treated to alloy it as required. In this case, if the alloying treatment temperature is less than 460° C., not only does the alloying rate becomes slower and is the productivity hindered, but also uneven alloying treatment occurs, so the alloying treatment temperature is 460° C. or more. On the other hand, if the alloying treatment temperature is more than 600° C., sometimes the alloying excessively proceeds and the coating adhesion of the steel sheet deteriorates. Further, sometimes pearlite transformation proceeds and the desired metallic structure cannot be obtained. Therefore, the alloying treatment temperature is 600° C. or less. The alloying treatment temperature may be 500° C. or more or may be 580° C. or less.

[Second Cooling: Cooling to Ms-50° C. or Less]

The steel sheet after the coating treatment or coating and alloying treatment is cooled by the second cooling which cools it down to the martensite transformation start temperature (Ms)-50° C. or less so as to make part or the majority of the austenite transform to martensite. The martensite produced here is tempered by the subsequent reheating and third soaking treatment to become tempered martensite. If the cooling stop temperature is more than Ms-50° C., since the tempered martensite is not sufficiently formed, the desired metallic structure is not obtained. If desiring to utilize the retained austenite for improving the ductility of the steel sheet, it is desirable to provide a lower limit to the cooling stop temperature. Specifically, the cooling stop temperature is desirably controlled to a range of Ms-50° C. to Ms-180° C.

Figure 2:
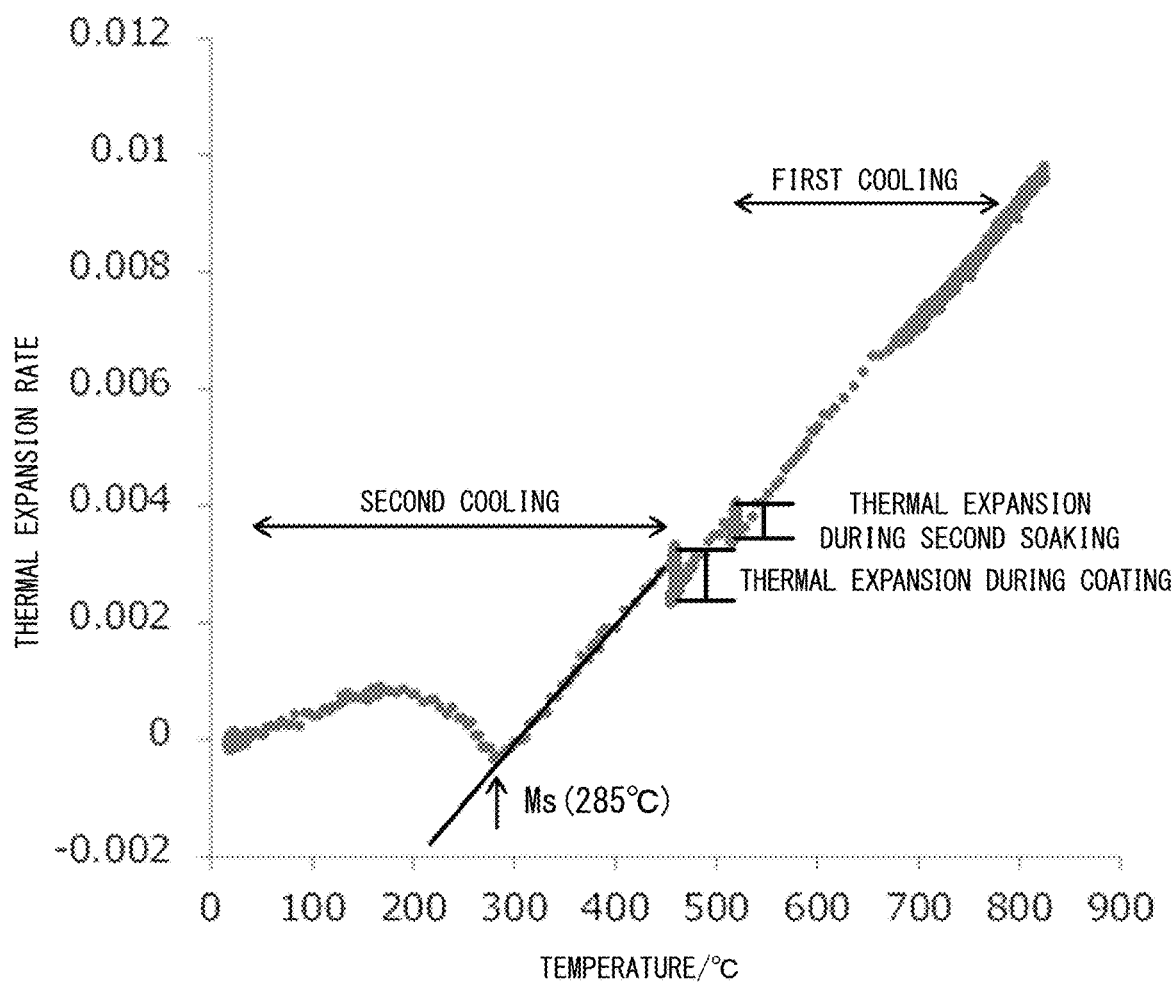
FIG. 2 is a temperature-thermal expansion curve when simulating a heat cycle corresponding to hot dip galvanization treatment according to the embodiment of the present invention by a thermal expansion measurement apparatus.

The martensite transformation in the present invention occurs after the ferrite transformation and bainite transformation. Along with the ferrite transformation and bainite transformation, C is diffused in the austenite. For this reason, this does not match the Ms when heating to the austenite single phase and rapidly cooling. The Ms in the present invention is found by measuring the thermal expansion temperature in the second cooling. For example, the Ms in the present invention can be found by using a Formastor tester or other apparatus able to measure the amount of thermal expansion during continuous heat treatment, reproducing the heat cycle of the hot dip galvanization line from the start of hot dip galvanization heat treatment (corresponding to room temperature) to the above second cooling, and measuring the thermal expansion temperature at that second cooling. However, in actual hot dip galvanization heat treatment, sometimes cooling is stopped between Ms to room temperature, but at the time of measurement of thermal expansion, cooling is performed down to room temperature. FIG. 2 is a temperature-thermal expansion curve simulating by a thermal expansion measurement device a heat cycle corresponding to the hot dip galvanization treatment according to an embodiment of the present invention. Steel sheet linearly thermally contracts in the second cooling step, but departs from a linear relationship at a certain temperature. The temperature at this time is the Ms in the present invention.

[Third Soaking Treatment: Holding in Temperature Region of 200° C. to 420° C. for 5 to 1000 Seconds]

After the second cooling, the steel sheet is reheated to a range of 200° C. to 420° C. for the third soaking treatment. In this step, the martensite produced at the time of the second cooling is tempered. If the holding temperature is less than 200° C. or the holding time is less than 5 seconds, the tempering does not sufficiently proceed. On the other hand, since bainite transformation does not sufficiently proceed, it becomes difficult to obtain the desired amount of retained austenite. On the other hand, if the holding temperature is more than 420° C. or if the holding time is more than 1000 seconds, since the martensite is excessively tempered and bainite transformation excessively proceeds, it becomes difficult to obtain the desired strength and metallic structure. The temperature of the third soaking treatment may be 240° C. or more and may be 400° C. or less. Further, the holding time may be 15 seconds or more or may be 100 seconds or more and may be 600 seconds or less.

After the third soaking treatment, the steel sheet is cooled down to room temperature to obtain the final finished product. The steel sheet may also be skin pass rolled to correct the flatness and adjust the surface roughness. In this case, to avoid deterioration of the ductility, the elongation rate is preferably 2% or less.

EXAMPLES

Next, examples of the present invention will be explained. The conditions in the examples are illustrations of conditions employed for confirming the workability and effects of the present invention. The present invention is not limited to these illustrations of conditions. The present invention can employ various conditions so long as not deviating from the gist of the present invention and achieving the object of the present invention.

Example A

Steels having the chemical compositions shown in Table 1 were cast to prepare slabs. The balance other than the constituents shown in Table 1 comprised Fe and impurities. These slabs were hot rolled under the conditions shown in Table 2 to produce hot rolled steel sheets. After that, the hot rolled steel sheets were pickled to remove the surface scale. After that, they were cold rolled. Further, the obtained steel sheets were continuously hot dip galvanized under the conditions shown in Table 2 and suitably treated for alloying. In the soaking treatments shown in Table 2, the temperatures were held within a range of the temperatures shown in Table 2±10° C. The chemical compositions of the base steel sheets obtained by analyzing samples taken from the produced hot dip galvanized steel sheets were equal with the chemical compositions of the steels shown in Table 1.

TABLE 1-1

| Steel type | C | Si | Mn | P | S | Al | N | O | Cr | Mo | V | Nb |
|---|---|---|---|---|---|---|---|---|---|---|---|---|
| A | 0.187 | 1.77 | 2.54 | 0.007 | 0.0011 | 0.025 | 0.0027 | 0.0006 | | | | |
| B | 0.201 | 1.52 | 1.50 | 0.010 | 0.0016 | 0.022 | 0.0035 | 0.0018 | | | | |
| C | 0.212 | 0.95 | 2.27 | 0.012 | 0.0012 | 0.015 | 0.0046 | 0.0018 | | 0.23 | | 0.022 |
| D | 0.140 | 1.29 | 1.12 | 0.007 | 0.0018 | 0.037 | 0.0014 | 0.0014 | 1.06 | 0.15 | | |
| E | 0.236 | 1.90 | 2.23 | 0.009 | 0.0019 | 0.019 | 0.0025 | 0.0015 | | | | |
| F | 0.313 | 1.84 | 3.06 | 0.009 | 0.0007 | 0.029 | 0.0018 | 0.0020 | 0.25 | 0.08 | | |
| G | 0.165 | 1.10 | 2.72 | 0.012 | 0.0025 | 0.021 | 0.0043 | 0.0014 | | | 0.27 | |
| H | 0.203 | 1.59 | 1.51 | 0.005 | 0.0026 | 0.041 | 0.0025 | 0.0019 | | | | |
| I | 0.132 | 0.34 | 2.33 | 0.007 | 0.0024 | 0.014 | 0.0017 | 0.0022 | | 0.19 | | 0.033 |
| J | 0.071 | 0.46 | 2.55 | 0.009 | 0.0007 | 0.123 | 0.0016 | 0.0021 | 0.49 | 0.10 | | |
| K | 0.113 | 0.78 | 2.32 | 0.019 | 0.0005 | 0.027 | 0.0047 | 0.0010 | 0.80 | | | 0.009 |
| L | 0.085 | 0.13 | 2.86 | 0.018 | 0.0013 | 0.029 | 0.0021 | 0.0018 | | | | |
| M | 0.295 | 1.88 | 2.04 | 0.009 | 0.0014 | 0.049 | 0.0010 | 0.0023 | | | | |
| N | 0.199 | 0.92 | 2.60 | 0.010 | 0.0028 | 0.652 | 0.0032 | 0.0005 | | | | |
| O | 0.166 | 1.04 | 2.47 | 0.015 | 0.0017 | 1.188 | 0.0027 | 0.0024 | | 0.23 | | |
| P | 0.222 | 0.48 | 2.60 | 0.008 | 0.0011 | 0.033 | 0.0029 | 0.0004 | | 0.15 | | 0.010 |
| Q | 0.045 | 1.31 | 2.55 | 0.015 | 0.0017 | 0.046 | 0.0039 | 0.0006 | | | | |
| R | 0.193 | 1.69 | 2.64 | 0.010 | 0.0016 | 0.017 | 0.0029 | 0.0006 | | | | |
| S | 0.145 | 1.18 | 3.96 | 0.011 | 0.0020 | 0.031 | 0.0018 | 0.0011 | | | | |
| T | 0.210 | 1.36 | 0.77 | 0.015 | 0.0017 | 0.044 | 0.0040 | 0.0009 | | | | |
| U | 0.166 | 2.88 | 1.52 | 0.010 | 0.0030 | 0.044 | 0.0028 | 0.0013 | | | | |
| V | 0.390 | 1.22 | 2.09 | 0.013 | 0.0011 | 0.035 | 0.0025 | 0.0013 | | | | |
| W | 0.194 | 1.40 | 2.25 | 0.016 | 0.0022 | 0.020 | 0.0019 | 0.0023 | | | | |

Bold underlines show outside ranges of present invention.
Empty fields in the table show corresponding constituents not intentionally added.

TABLE 1-2

| Steel type | Ti | B | Cu | Ni | Co | W | Sn | Sb | Others | Ac1 |
|---|---|---|---|---|---|---|---|---|---|---|
| A | 0.015 | 0.0023 | | | | | | | Mg: 0.0045 | 747 |
| B | 0.101 | 0.0006 | | | | | | | | 751 |
| C | 0.010 | 0.0018 | | | | | | | | 726 |
| D | 0.013 | 0.0029 | | | | | | | | 766 |
| E | 0.022 | 0.0008 | 0.25 | 0.16 | | | | | | 752 |
| F | 0.016 | 0.0021 | | | | | | | | 748 |
| G | 0.064 | 0.0012 | | | | | | | Ce: 0.0050 | 726 |
| H | 0.011 | 0.0022 | | | 0.23 | 0.37 | | | | 753 |
| I | 0.029 | 0.0018 | | | | | | | | 708 |
| J | 0.018 | 0.0035 | | | | | | | Ca: 0.0044 | 717 |
| K | 0.023 | 0.0010 | | | | | 0.11 | 0.08 | | 734 |
| L | 0.020 | 0.0038 | | | | | | | La: 0.0013, Hf: 0.0056 | 696 |
| M | 0.009 | 0.0029 | | | | | | | Bi: 0.0067 | 756 |
| N | 0.018 | 0.0020 | | | | | | | REM: 0.0072 | 722 |
| O | 0.034 | 0.0014 | | | | | | | Zr: 0.0053 | 727 |
| P | 0.015 | 0.0018 | 0.12 | | | | | | | 709 |
| Q | 0.018 | 0.0021 | | | | | | | | 734 |
| R | 0.019 | 0.0003 | | | | | | | | 744 |
| S | 0.025 | 0.0028 | | | | | | | | 715 |
| T | 0.023 | 0.0015 | | | | | | | | 754 |
| U | 0.019 | 0.0020 | | | | | | | | 791 |
| V | 0.020 | 0.0025 | | | | | | | | 736 |
| W | 0.013 | 0.0108 | | | | | | | | 740 |

Bold underlines show outside ranges of present invention.
Empty fields in the table show corresponding constituents not intentionally added.

TABLE 2-1

| | | | | | Hot rolling step | | | | | | | |
|---|---|---|---|---|---|---|---|---|---|---|---|---|
| No. | Steel type | Slab heating temp. °C. | $T_B$ °C. | Dwell time at $T_B$ or less s | Total rolling reduction of rough rolling at 1050° C. or more % | Finish inlet side temp. °C. | Finish exit side temp. °C. | Finish rolling total rolling reduction % | V °C./s | Cooling rate from finish exit side to 800° C. °C./s | Coiling temp. °C. | Cold rolling step Cold rolling reduction % |
| 1 | A | 1200 | 1064 | 23 | 84 | 1050 | 900 | 92 | 3.9 | 5.5 | 580 | 53 |
| 2 | A | 1240 | 1064 | 70 | 84 | 1020 | 910 | 92 | 3.9 | 6.8 | 490 | 53 |
| 3 | A | 1270 | 1064 | 55 | 84 | 1020 | 920 | 92 | 3.9 | 6.3 | 500 | 53 |
| 4 | A | 1200 | 1064 | 39 | 84 | 1040 | 930 | 92 | 3.9 | 5.9 | 600 | 53 |
| 5 | A | 1270 | 1064 | 33 | 84 | 1030 | 920 | 92 | 3.9 | 7.0 | 550 | 53 |
| 6 | A | 1250 | 1064 | 20 | 84 | 1050 | 920 | 92 | 3.9 | 5.6 | 510 | 53 |
| 7 | B | 1240 | 1006 | 0 | 84 | 1050 | 910 | 92 | 1.6 | 5.2 | 470 | 53 |
| 8 | B | 1270 | 1006 | 11 | 84 | 990 | 900 | 92 | 1.6 | 4.7 | 530 | 53 |
| 9 | B | 1220 | 1006 | 0 | 84 | 1040 | 920 | 92 | 1.6 | 4.9 | 470 | 53 |
| 10 | C | 1250 | 1080 | 101 | 84 | 1030 | 940 | 92 | 6.2 | 7.1 | 520 | 53 |
| 11 | C | 1190 | 1080 | 459 | 84 | 980 | 920 | 92 | 6.2 | 6.8 | 490 | 53 |
| 12 | C | 1220 | 1080 | 59 | 84 | 1050 | 950 | 92 | 6.2 | 1.8 | 610 | 53 |
| 13 | C | 1260 | 1080 | 73 | 84 | 1030 | 950 | 92 | 6.2 | 7.9 | 600 | 53 |
| 14 | D | 1240 | 1041 | 14 | 84 | 1030 | 920 | 92 | 2.4 | 6.0 | 490 | 53 |
| 15 | D | 1250 | 1041 | 40 | 84 | 1000 | 930 | 92 | 2.4 | 6.2 | 620 | 53 |
| 16 | D | 1250 | 1041 | 46 | 84 | 1000 | 950 | 92 | 2.4 | 5.9 | 470 | 53 |
| 17 | D | 1230 | 1041 | 0 | 84 | 1050 | 940 | 92 | 2.4 | 6.1 | 570 | 53 |
| 18 | E | 1230 | 1004 | 0 | 84 | 1050 | 900 | 92 | 1.6 | 5.3 | 620 | 53 |
| 19 | E | 1280 | 1004 | 3 | 84 | 1000 | 920 | 92 | 1.6 | 5.4 | 520 | 53 |
| 20 | E | 1270 | 1004 | 0 | 84 | 1010 | 950 | 92 | 1.6 | 5.2 | 570 | 53 |

Bold underlines show outside ranges of present invention.

TABLE 2-2

| | | | | | Hot rolling step | | | | | | | |
|---|---|---|---|---|---|---|---|---|---|---|---|---|
| No. | Steel type | Slab heating temp. °C. | $T_B$ °C. | Dwell time at $T_B$ or less s | Total rolling reduction of rough rolling at 1050° C. or more % | Finish inlet side temp. °C. | Finish exit side temp. °C. | Finish rolling total rolling reduction % | V °C./s | Cooling rate from finish exit side to 800° C. °C./s | Coiling temp. °C. | Cold rolling step Cold rolling reduction % |
| 21 | F | 1220 | 1037 | 19 | 86 | 1020 | 950 | 88 | 2.3 | 5.8 | 610 | 40 |
| 22 | F | 1280 | 1037 | 16 | 86 | 1020 | 930 | 92 | 2.3 | 6.0 | 480 | 40 |
| 23 | F | 1270 | 1037 | 6 | 86 | 1030 | 950 | 92 | 2.3 | 6.1 | 590 | 40 |
| 24 | G | 1270 | 1054 | 72 | 84 | 1000 | 950 | 92 | 3.1 | 5.0 | 590 | 53 |
| 25 | G | 1230 | 1054 | 16 | 84 | 1040 | 920 | 92 | 3.1 | 6.5 | 580 | 53 |
| 26 | G | 1280 | 1054 | 75 | 84 | 1000 | 900 | 92 | 3.1 | 6.3 | 540 | 53 |
| 27 | G | 1230 | 1054 | 53 | 84 | 1010 | 910 | 92 | 3.1 | 6.8 | 480 | 53 |
| 28 | H | 1250 | 1057 | 21 | 84 | 1040 | 950 | 92 | 3.4 | 5.9 | 490 | 53 |
| 29 | H | 1280 | 1057 | 44 | 84 | 1010 | 930 | 92 | 3.4 | 6.2 | 480 | 53 |
| 30 | H | 1270 | 1057 | 31 | 84 | 1030 | 930 | 92 | 3.4 | 5.7 | 500 | 53 |
| 31 | H | 1250 | 1057 | 19 | 84 | 1040 | 950 | 92 | 3.4 | 5.9 | 540 | 53 |
| 32 | I | 1260 | 1026 | 0 | 84 | 1030 | 920 | 92 | 2.0 | 5.2 | 520 | 53 |
| 33 | I | 1250 | 1026 | 30 | 84 | 1000 | 920 | 92 | 2.0 | 5.7 | 510 | 53 |
| 34 | I | 1280 | 1026 | 0 | 84 | 1130 | 1040 | 92 | 2.0 | 5.9 | 530 | 53 |
| 35 | J | 1260 | 1058 | 62 | 84 | 1010 | 910 | 92 | 3.4 | 6.0 | 540 | 53 |
| 36 | J | 1220 | 1058 | 70 | 84 | 1020 | 910 | 92 | 3.4 | 6.0 | 550 | 53 |
| 37 | J | 1210 | 1058 | 40 | 84 | 1030 | 960 | 92 | 3.4 | 5.5 | 600 | 53 |
| 38 | K | 1240 | 1049 | 43 | 84 | 1010 | 920 | 92 | 2.8 | 6.1 | 500 | 53 |
| 39 | K | 1240 | 1049 | 0 | 84 | 1050 | 950 | 92 | 2.8 | 5.7 | 600 | 53 |
| 40 | K | 1250 | 1049 | 17 | 84 | 1030 | 960 | 92 | 2.8 | 5.8 | 550 | 53 |

Bold underlines show outside ranges of present invention.

TABLE 2-3

| | | | | | Hot rolling step | | | | | | | |
|---|---|---|---|---|---|---|---|---|---|---|---|---|
| No. | Steel type | Slab heating temp. ° C. | $T_B$ ° C. | Dwell time at $T_B$ or less s | Total rolling reduction of rough rolling at 1050° C. or more % | Finish inlet side temp. ° C. | Finish exit side temp. ° C. | Finish rolling total rolling reduction % | V ° C./s | Cooling rate from finish exit side to 800° C. ° C./s | Coiling temp. ° C. | Cold rolling step Cold rolling reduction % |
| 41 | L | 1220 | 1078 | 66 | 84 | 1040 | 960 | 92 | 5.8 | 6.2 | 580 | 75 |
| 42 | L | 1260 | 1078 | 59 | 84 | 1040 | 910 | 92 | 5.8 | 6.3 | 590 | 75 |
| 43 | M | 1210 | 1023 | 3 | 84 | 1020 | 950 | 92 | 1.9 | 5.3 | 580 | 53 |
| 44 | M | 1230 | 1023 | 0 | 84 | 1040 | 950 | 92 | 1.9 | 6.6 | 560 | 53 |
| 45 | M | 1230 | 1023 | 3 | 84 | 1020 | 920 | 92 | 1.9 | 6.6 | 570 | 53 |
| 46 | N | 1260 | 1066 | 89 | 84 | 1010 | 930 | 92 | 4.1 | 6.6 | 600 | 53 |
| 47 | N | 1210 | 1066 | 20 | 84 | 1050 | 950 | 50 | 4.1 | 5.4 | 600 | 53 |
| 48 | N | 1240 | 1066 | 28 | 84 | 1040 | 970 | 92 | 4.1 | 6.7 | 570 | 53 |
| 49 | O | 1210 | 1037 | 0 | 84 | 1050 | 950 | 92 | 2.3 | 6.3 | 540 | 53 |
| 50 | O | 1240 | 1037 | 0 | 84 | 1040 | 960 | 92 | 2.3 | 6.5 | 530 | 53 |
| 51 | P | 1220 | 1055 | 84 | 84 | 1010 | 930 | 92 | 3.2 | 6.7 | 600 | 53 |
| 52 | P | 1210 | 1055 | 24 | 84 | 1040 | 940 | 92 | 3.2 | 5.6 | 540 | 53 |
| 53 | P | 1220 | 1055 | 56 | 84 | 1020 | 910 | 92 | 3.2 | 5.3 | 550 | 53 |
| 54 | Q | 1240 | 1080 | 54 | 84 | 1040 | 920 | 92 | 6.1 | 8.1 | 590 | 53 |
| 55 | R | 1260 | 963 | 0 | 84 | 1010 | 900 | 92 | 1.2 | 7.1 | 560 | 53 |
| 56 | S | 1270 | 1053 | 55 | 84 | 1010 | 890 | 92 | 3.0 | 7.5 | 500 | 53 |
| 57 | T | 1250 | 1062 | 63 | 84 | 1020 | 880 | 92 | 3.7 | 6.9 | 540 | 53 |
| 58 | U | 1230 | 1058 | 34 | 84 | 1030 | 940 | 92 | 3.4 | 7.6 | 520 | 53 |
| 59 | V | 1210 | 1064 | 35 | 84 | 1040 | 920 | 92 | 4.0 | 8.2 | 600 | 53 |
| 60 | W | 1270 | 1134 | 259 | 84 | 1050 | 960 | 92 | 91.3 | 8.0 | 580 | 53 |
| 61 | A | 1220 | 1064 | 16 | 84 | 1050 | 940 | 92 | 3.9 | 6.2 | 730 | 53 |

Bold underlines show outside ranges of present invention.

TABLE 2-4

| | | Hot dip galvanization step | | | | | | | | | |
|---|---|---|---|---|---|---|---|---|---|---|---|
| | Heating Heating rate 650° C. to maximum heating temp. | First soaking treatment | | First cooling | Second soaking treatment | | Alloying treatment | Second cooling Cooling stop | Third soaking treatment | | Ms at hot dip galvanization step |
| No. | ° C./s | Temp. ° C. | Holding time s | Cooling rate ° C./s | Temp. ° C. | Holding time s | Alloying temp. ° C. | temp. ° C. | Temp. ° C. | Holding time s | ° C. |
| 1 | 1.4 | 850 | 90 | 28 | 550 | 100 | 530 | 250 | 380 | 330 | 366 |
| 2 | 2.1 | 890 | 90 | 30 | 560 | 100 | 540 | 250 | 400 | 330 | 382 |
| 3 | 1.7 | 850 | 90 | 39 | 420 | 100 | 540 | 250 | 390 | 330 | 359 |
| 4 | 2.0 | 860 | 90 | 22 | 560 | 60 | 530 | 230 | 390 | 330 | 369 |
| 5 | 1.9 | 850 | 90 | 23 | 540 | 100 | 540 | 260 | 500 | 330 | 367 |
| 6 | 1.6 | 850 | 90 | 21 | 550 | 100 | — | 240 | 390 | 330 | 363 |
| 7 | 1.8 | 840 | 90 | 25 | 520 | 100 | 510 | 250 | 400 | 330 | 353 |
| 8 | 1.6 | 840 | 90 | 28 | 530 | 100 | 500 | 40 | 390 | 330 | 364 |
| 9 | 2.0 | 850 | 90 | 29 | 520 | 590 | 520 | 150 | 400 | 330 | 217 |
| 10 | 1.5 | 820 | 90 | 24 | 550 | 100 | 530 | 230 | 390 | 330 | 362 |
| 11 | 1.4 | 830 | 90 | 22 | 540 | 100 | 530 | 270 | 390 | 330 | 364 |
| 12 | 1.5 | 830 | 90 | 23 | 550 | 100 | 520 | 250 | 390 | 330 | 364 |
| 13 | 1.6 | 830 | 90 | 22 | 550 | 100 | — | 240 | 380 | 330 | 364 |
| 14 | 1.6 | 870 | 90 | 29 | 550 | 100 | 550 | 200 | 300 | 330 | 427 |
| 15 | 1.8 | 850 | 90 | 24 | 550 | 100 | 540 | 290 | 320 | 330 | 419 |
| 16 | 1.5 | 850 | 90 | 25 | 570 | 390 | 540 | 280 | 320 | 330 | 417 |
| 17 | 1.8 | 860 | 90 | 21 | 650 | 100 | 550 | 280 | 320 | 330 | 357 |
| 18 | 1.5 | 840 | 90 | 19 | 560 | 100 | 530 | 250 | 400 | 330 | 361 |
| 19 | 1.6 | 870 | 90 | 21 | 560 | 100 | 530 | 250 | 340 | 330 | 372 |
| 20 | 0.9 | 760 | 90 | 21 | 550 | 100 | 530 | 250 | 380 | 330 | 91 |

Bold underlines show outside ranges of present invention.

TABLE 2-5

| | | | | | | | | | | | |
|---|---|---|---|---|---|---|---|---|---|---|---|
| | Heating Heating rate 650° C. to maximum | First soaking treatment | | First cooling | Second soaking treatment | | Alloying treatment | Second cooling Cooling | Third soaking treatment | | Ms at hot dip |
| No. | heating temp. ° C./s | Temp. ° C. | Holding time s | Cooling rate ° C./s | Temp. ° C. | Holding time s | Alloying temp. ° C. | stop temp. ° C. | Temp. ° C. | Holding time s | galvanization step ° C. |
| 21 | 1.7 | 860 | 90 | 31 | 540 | 100 | 560 | 210 | 380 | 330 | 313 |
| 22 | 1.0 | 860 | 135 | 14 | 540 | 150 | 550 | 210 | 380 | 495 | 312 |
| 23 | 1.5 | 860 | 90 | 27 | 550 | 100 | — | 180 | 390 | 330 | 313 |
| 24 | 1.3 | 840 | 90 | 23 | 550 | 100 | 580 | 150 | 300 | 110 | 365 |
| 25 | 1.6 | 840 | 90 | 19 | 560 | 100 | 570 | 160 | 180 | 330 | 366 |
| 26 | 1.3 | 840 | 90 | 25 | 550 | 100 | 570 | 160 | 300 | 3 | 365 |
| 27 | 1.4 | 840 | 90 | 28 | 550 | 100 | 570 | 160 | 240 | 330 | 366 |
| 28 | 1.6 | 850 | 90 | 27 | 490 | 100 | 540 | 280 | 390 | 330 | 373 |
| 29 | 1.9 | 850 | 90 | 29 | 490 | 100 | — | 280 | 380 | 330 | 371 |
| 30 | 1.4 | 850 | 90 | 3 | 500 | 100 | 530 | 220 | 390 | 330 | 278 |
| 31 | 1.5 | 840 | 90 | 29 | 490 | 100 | 630 | 260 | 390 | 330 | 351 |
| 32 | 1.7 | 820 | 90 | 23 | 560 | 100 | 550 | 80 | 280 | 15 | 402 |
| 33 | 1.7 | 820 | 90 | 24 | 550 | 470 | 540 | 60 | 280 | 15 | 401 |
| 34 | 1.8 | 830 | 90 | 25 | 550 | 100 | 550 | 80 | 280 | 15 | 405 |
| 35 | 1.3 | 810 | 90 | 21 | 550 | 100 | 560 | 70 | 290 | 15 | 401 |
| 36 | 0.1 | 800 | 90 | 19 | 560 | 100 | 540 | 80 | 280 | 15 | 398 |
| 37 | 1.1 | 810 | 90 | 18 | 570 | 100 | — | 50 | 290 | 15 | 402 |
| 38 | 1.6 | 810 | 90 | 24 | 550 | 100 | 580 | 50 | 280 | 15 | 395 |
| 39 | 1.5 | 810 | 90 | 23 | 560 | 80 | 590 | 70 | 300 | 15 | 395 |
| 40 | 1.4 | 820 | 90 | 21 | 560 | 100 | — | 90 | 300 | 15 | 398 |

Bold underlines show outside ranges of present invention.

TABLE 2-6

| | | | | | | | | | | | |
|---|---|---|---|---|---|---|---|---|---|---|---|
| | Heating Heating rate 650° C. to maximum | First soaking treatment | | First cooling | Second soaking treatment | | Alloying treatment | Second cooling Cooling | Third soaking treatment | | Ms at hot dip |
| No. | heating temp. ° C./s | Temp. ° C. | Holding time s | Cooling rate ° C./s | Temp. ° C. | Holding time s | Alloying temp. ° C. | stop temp. ° C. | Temp. ° C. | Holding time s | galvanization step ° C. |
| 41 | 1.2 | 810 | 90 | 23 | 540 | 100 | 560 | 60 | 240 | 15 | 389 |
| 42 | 1.3 | 810 | 90 | 17 | 550 | 100 | — | 50 | 240 | 15 | 391 |
| 43 | 2.1 | 870 | 90 | 22 | 550 | 100 | 530 | 250 | 400 | 330 | 355 |
| 44 | 2.2 | 870 | 450 | 30 | 550 | 100 | 530 | 230 | 400 | 330 | 363 |
| 45 | 1.7 | 870 | 90 | 26 | 560 | 100 | — | 250 | 400 | 330 | 354 |
| 46 | 2.1 | 870 | 90 | 26 | 530 | 100 | 560 | 260 | 410 | 330 | 367 |
| 47 | 1.7 | 880 | 90 | 29 | 540 | 100 | 550 | 250 | 400 | 330 | 377 |
| 48 | 1.7 | 870 | 90 | 33 | 530 | 100 | — | 230 | 400 | 330 | 369 |
| 49 | 1.8 | 920 | 90 | 26 | 560 | 100 | 550 | 260 | 400 | 330 | 360 |
| 50 | 2.1 | 920 | 90 | 25 | 560 | 100 | — | 270 | 400 | 330 | 357 |
| 51 | 1.6 | 850 | 90 | 23 | 550 | 100 | 510 | 60 | 280 | 15 | 367 |
| 52 | 1.9 | 850 | 90 | 23 | 550 | 100 | 520 | 100 | 250 | 330 | 367 |
| 53 | 1.8 | 860 | 90 | 21 | 550 | 100 | — | 50 | 280 | 15 | 367 |
| 54 | 1.6 | 870 | 90 | 25 | 550 | 100 | 510 | 290 | 380 | 330 | 420 |
| 55 | 2.0 | 850 | 90 | 26 | 550 | 100 | 500 | 280 | 390 | 330 | 349 |
| 56 | 1.2 | 820 | 90 | 24 | 550 | 100 | 530 | 220 | 390 | 330 | 340 |
| 57 | 1.6 | 880 | 90 | 23 | 550 | 100 | 490 | 200 | 380 | 330 | 160 |
| 58 | 1.7 | 890 | 90 | 31 | 550 | 100 | 590 | 240 | 400 | 330 | 386 |
| 59 | 1.2 | 820 | 90 | 23 | 550 | 100 | 540 | 200 | 370 | 330 | 307 |
| 60 | 1.9 | 870 | 90 | 26 | 540 | 100 | 580 | 210 | 380 | 330 | 280 |
| 61 | 1.8 | 850 | 90 | 36 | 550 | 100 | 510 | 250 | 400 | 330 | 348 |

Bold underlines show outside ranges of present invention.

A JIS No. 5 tensile test piece was taken from each of the thus obtained steel sheets in a direction perpendicular to the rolling direction and was subjected to a tensile test based on JIS Z2241: 2011 to measure the tensile strength (TS) and total elongation (El). Further, each test piece was tested by the "JFS T 1001 Hole Expansion Test Method" of the Japan Iron and Steel Federation Standards to measure the hole expansion rate (λ). A test piece with a TS of 980 MPa or more and a TS×El×λ$^{0.5}$/1000 of 80 or more was judged good in mechanical properties and as having press formability preferable for use as a member for automobiles.

Figure 3:
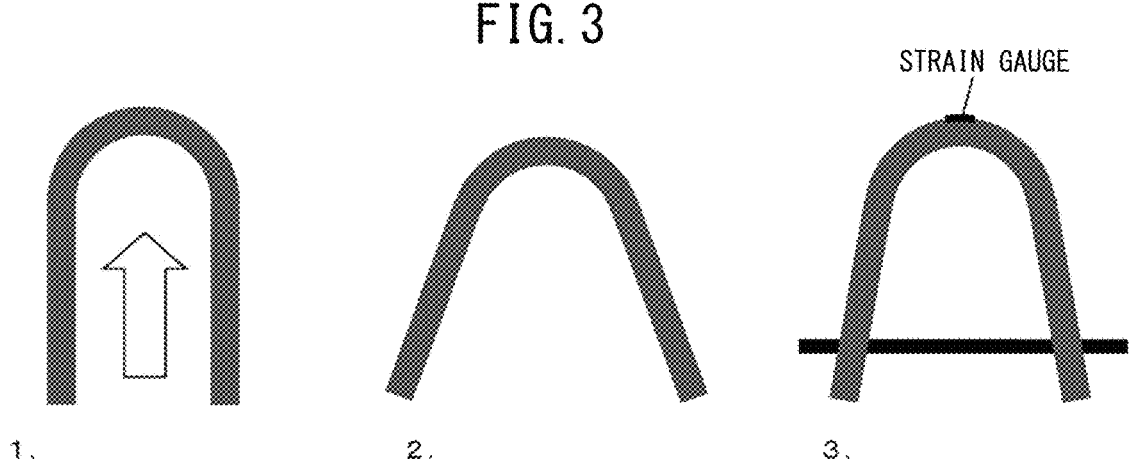
FIG. 3 is a view schematically showing a test method for evaluating hydrogen embrittlement resistance after plastic deformation.

The hydrogen embrittlement resistance after the plastic deformation was evaluated by a U-bending test. First, a 30 mm×120 mm strip-shaped test piece was taken from the steel sheet so that the longitudinal direction of the test piece and the rolling direction of the steel sheet became vertical and holes were drilled for fastening the bolts at the two ends of the test piece. Next, as shown in FIG. 3, a radius 5 mm punch was used bending by 180°. After that, the sprung back U-bending test piece was stressed by fastening it using bolts and nuts. At that time, a GL5 mm strain gauge was attached to the top part of the U-bending test piece and stress was applied by control of the amount of strain. The applied stress corresponded to 1000 MPa. At this time, the strain was converted to stress from the stress-strain curve obtained in advance by a tensile test. After that, the test piece was dipped in a pH 1.0 hydrochloric acid for 24 hours. The end faces of the U-bent test piece was left as sheared. A test piece with cracks recognized at the bent tip after the end of the test was judged as "poor", while one with no cracks recognized was judged as "very good". An evaluation of very good was deemed passing.

The results are shown in Table 3. In Table 3, "GA" means hot dip galvannealing, while GI means hot dip galvanizing without alloying treatment.

TABLE 3-1

| No. | Steel type | Coating | Microstructure | | | | | |
| | | | Ferrite % | Retained austenite % | Tempered martensite % | Fresh martensite % | Pearlite + cementite % | Bainite % |
|---|---|---|---|---|---|---|---|---|
| 1 | A | GA | 18 | 10 | 54 | 2 | 0 | 16 |
| 2 | A | GA | 0 | 9 | 73 | 1 | 0 | 17 |
| 3 | A | GA | 20 | 11 | 32 | 3 | 0 | 34 |
| 4 | A | GA | 15 | 9 | 60 | 0 | 0 | 16 |
| 5 | A | GA | 18 | 3 | 55 | 5 | 6 | 13 |
| 6 | A | GI | 19 | 11 | 46 | 1 | 0 | 23 |
| 7 | B | GA | 34 | 12 | 17 | 2 | 0 | 35 |
| 8 | B | GA | 34 | 4 | 50 | 0 | 0 | 12 |
| 9 | B | GA | 28 | 10 | 3 | 2 | 0 | 57 |
| 10 | C | GA | 20 | 9 | 58 | 1 | 0 | 12 |
| 11 | C | GA | 16 | 9 | 49 | 1 | 0 | 25 |
| 12 | C | GA | 17 | 9 | 55 | 1 | 0 | 18 |
| 13 | C | GI | 17 | 10 | 52 | 1 | 0 | 20 |
| 14 | D | GA | 13 | 6 | 77 | 2 | 0 | 2 |
| 15 | D | GA | 21 | 7 | 56 | 2 | 0 | 14 |
| 16 | D | GA | 22 | 7 | 50 | 1 | 0 | 20 |
| 17 | D | GA | 57 | 6 | 15 | 3 | 0 | 19 |
| 18 | E | GA | 10 | 16 | 58 | 2 | 0 | 14 |
| 19 | E | GA | 0 | 14 | 77 | 1 | 0 | 8 |
| 20 | E | GA | 75 | 6 | 0 | 4 | 6 | 9 |

| No. | Microstructure | | Mechanical properties | | | | | Remarks |
| | Former γ grain boundary B conc. atm % | Average effective grain size μm | Press formability | | | | Hydrogen embrittlement resistance | |
| | | | TS MPa | El % | λ % | TS*El*λ$^{0.5}$/ 1000 | | |
|---|---|---|---|---|---|---|---|---|
| 1 | 3.8 | 4.8 | 1216 | 17.1 | 43 | 136 | Very good | Ex. |
| 2 | 4.1 | 5.3 | 1257 | 14.5 | 57 | 138 | Very good | Ex. |
| 3 | 1.7 | 4.5 | 1148 | 17.7 | 30 | 111 | Poor | Comp. ex. |
| 4 | 1.8 | 5.0 | 1221 | 16.4 | 41 | 128 | Poor | Comp. ex. |
| 5 | 4.0 | 4.7 | 1075 | 14.2 | 22 | 72 | Very good | Comp. ex. |
| 6 | 4.0 | 4.9 | 1209 | 17.5 | 44 | 140 | Very good | Ex. |
| 7 | 2.3 | 3.0 | 1025 | 23.6 | 30 | 132 | Very good | Ex. |
| 8 | 2.9 | 3.4 | 1103 | 14.4 | 34 | 93 | Very good | Ex. |
| 9 | 2.5 | 3.7 | 931 | 21.2 | 26 | 101 | Very good | Comp. ex. |
| 10 | 3.4 | 4.0 | 1196 | 16.6 | 51 | 142 | Very good | Ex. |
| 11 | 1.6 | 3.9 | 1183 | 15.2 | 38 | 111 | Poor | Comp. ex. |

TABLE 3-1-continued

| 12 | 1.5 | 4.2 | 1190 | 15.5 | 40 | 117 | Poor | Comp. ex. |
| 13 | 3.6 | 4.0 | 1188 | 16.5 | 54 | 144 | Very good | Ex. |
| 14 | 5.1 | 4.1 | 1230 | 11.3 | 48 | 96 | Very good | Ex. |
| 15 | 4.7 | 4.8 | 1201 | 14.6 | 40 | 111 | Very good | Ex. |
| 16 | 5.5 | 4.8 | 1183 | 15.0 | 35 | 105 | Very good | Ex. |
| 17 | 1.4 | 6.3 | 960 | 19.1 | 27 | 95 | Poor | Comp. ex. |
| 18 | 2.8 | 4.5 | 1277 | 18.2 | 31 | 129 | Very good | Ex. |
| 19 | 2.7 | 4.4 | 1369 | 14.4 | 27 | 102 | Very good | Ex. |
| 20 | 2.0 | 6.1 | 944 | 15.5 | 18 | 62 | Very good | Comp. ex. |

Bold underlines show outside ranges of present invention

TABLE 3-2

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 21 | F | GA | 0 | 20 | 78 | 2 | 0 | 0 |
| 22 | F | GA | 0 | 19 | 70 | 1 | 0 | 10 |
| 23 | F | GI | 0 | 17 | 83 | 0 | 0 | 0 |
| 24 | G | GA | 12 | 7 | 64 | 4 | 0 | 13 |
| 25 | G | GA | 12 | 3 | 62 | 11 | 0 | 12 |
| 26 | G | GA | 13 | 2 | 62 | 12 | 0 | 11 |
| 27 | G | GA | 12 | 6 | 63 | 7 | 0 | 12 |
| 28 | H | GA | 26 | 12 | 29 | 1 | 0 | 32 |
| 29 | H | GI | 26 | 13 | 25 | 2 | 0 | 34 |
| 30 | H | GA | 61 | 13 | 10 | 4 | 0 | 12 |
| 31 | H | GA | 33 | 7 | 12 | 4 | 6 | 38 |
| 32 | I | GA | 13 | 2 | 70 | 2 | 0 | 13 |
| 33 | I | GA | 13 | 2 | 59 | 3 | 0 | 23 |
| 34 | I | GA | 8 | 1 | 74 | 3 | 0 | 14 |
| 35 | J | GA | 37 | 0 | 45 | 4 | 0 | 14 |
| 36 | J | GA | 41 | 0 | 43 | 3 | 0 | 13 |
| 37 | J | GI | 37 | 0 | 55 | 2 | 0 | 6 |
| 38 | K | GA | 16 | 1 | 75 | 3 | 0 | 5 |
| 39 | K | GA | 15 | 1 | 72 | 3 | 0 | 9 |
| 40 | K | GI | 8 | 1 | 70 | 3 | 0 | 18 |

| | Microstructure | | Mechanical properties | | | | | |
|---|---|---|---|---|---|---|---|---|
| | Former γ grain boundary B conc. | Average effective grain size | Press formability | | | | Hydrogen embrittlement | |
| No. | atm % | μm | TS MPa | El % | λ % | TS*El*$\lambda^{0.5}$/ 1000 | resistance | Remarks |
| 21 | 5.1 | 4.9 | 1506 | 19.1 | 30 | 158 | Very good | Ex. |
| 22 | 5.0 | 5.2 | 1477 | 19.5 | 26 | 147 | Very good | Ex. |
| 23 | 4.7 | 4.8 | 1491 | 19.4 | 27 | 150 | Very good | Ex. |
| 24 | 3.0 | 3.9 | 1195 | 12.0 | 40 | 91 | Very good | Ex. |
| 25 | 3.0 | 4.0 | 1262 | 10.7 | 24 | 66 | Poor | Comp. ex. |
| 26 | 3.2 | 4.4 | 1230 | 10.9 | 28 | 71 | Poor | Comp. ex. |
| 27 | 3.1 | 4.3 | 1221 | 11.5 | 35 | 83 | Very good | Ex. |
| 28 | 4.6 | 5.9 | 1114 | 19.5 | 33 | 125 | Very good | Ex. |

TABLE 3-2-continued

| | | | | | | | | |
|---|---|---|---|---|---|---|---|---|
| 29 | 4.5 | 5.5 | 1112 | 19.8 | 30 | 121 | Very good | Ex. |
| 30 | 4.2 | 6.5 | 969 | 23.6 | 18 | 97 | Very good | Comp. ex. |
| 31 | 4.6 | 5.9 | 991 | 18.1 | 19 | 78 | Very good | Comp. ex. |
| 32 | 4.3 | 4.1 | 1234 | 10.8 | 47 | 91 | Very good | Ex. |
| 33 | 5.0 | 4.4 | 1196 | 11.2 | 40 | 85 | Very good | Ex. |
| 34 | 6.1 | 9.3 | 1208 | 10.1 | 45 | 82 | Poor | Comp. ex. |
| 35 | 4.8 | 4.2 | 1016 | 13.1 | 53 | 97 | Very good | Ex. |
| 36 | 5.2 | 8.9 | 1007 | 13.8 | 46 | 94 | Poor | Comp. ex. |
| 37 | 4.9 | 4.3 | 1009 | 13.3 | 53 | 98 | Very good | Ex. |
| 38 | 5.6 | 4.7 | 1195 | 10.6 | 60 | 98 | Very good | Ex. |
| 39 | 2.4 | 4.5 | 1189 | 10.9 | 54 | 95 | Very good | Ex. |
| 40 | 5.0 | 4.8 | 1200 | 10.8 | 56 | 97 | Very good | Ex. |

Bold underlines show outside ranges of present invention

TABLE 3-3

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 41 | L | GA | 34 | 0 | 40 | 2 | 0 | 24 |
| 42 | L | GI | 33 | 0 | 45 | 2 | 0 | 20 |
| 43 | M | GA | 4 | 20 | 51 | 2 | 0 | 23 |
| 44 | M | GA | 0 | 19 | 66 | 2 | 0 | 13 |
| 45 | M | GI | 5 | 19 | 50 | 3 | 0 | 23 |
| 46 | N | GA | 25 | 11 | 43 | 2 | 0 | 19 |
| 47 | N | GA | 17 | 10 | 49 | 2 | 0 | 22 |
| 48 | N | GI | 25 | 12 | 50 | 1 | 0 | 12 |
| 49 | O | GA | 48 | 9 | 15 | 1 | 0 | 27 |
| 50 | O | GI | 48 | 10 | 9 | 2 | 0 | 31 |
| 51 | P | GA | 0 | 2 | 96 | 2 | 0 | 0 |
| 52 | P | GA | 0 | 4 | 92 | 4 | 0 | 0 |
| 53 | P | GI | 0 | 2 | 96 | 2 | 0 | 0 |
| 54 | Q | GA | 35 | 1 | 37 | 0 | 0 | 27 |
| 55 | R | GA | 19 | 12 | 41 | 2 | 0 | 26 |
| 56 | S | GA | 7 | 4 | 69 | 20 | 0 | 0 |
| 57 | T | GA | 51 | 9 | 0 | 0 | 0 | 40 |
| 58 | u | GA | 39 | 5 | 15 | 18 | 0 | 23 |
| 59 | V | GA | 8 | 24 | 29 | 12 | 0 | 27 |
| 60 | w | GA | 58 | 9 | 12 | 3 | 0 | 18 |
| 61 | A | GA | 29 | 9 | 31 | 2 | 0 | 29 |

| | Microstructure Former | | Mechanical properties | | | | | |
|---|---|---|---|---|---|---|---|---|
| | γ grain | Average effective | Press formability | | | | | |
| No. | boundary B conc. atm % | grain size μm | TS MPa | El % | λ % | TS*El* λ^0.5/ 1000 | Hydrogen embrittlement resistance | Remarks |
| 41 | 4.9 | 5.0 | 1033 | 11.8 | 52 | 88 | Very good | Ex. |
| 42 | 5.1 | 4.9 | 1024 | 12.0 | 50 | 87 | Very good | Ex. |
| 43 | 5.3 | 4.7 | 1237 | 21.5 | 32 | 150 | Very good | Ex. |
| 44 | 5.3 | 5.2 | 1260 | 20.1 | 41 | 162 | Very good | Ex. |
| 45 | 5.5 | 4.9 | 1206 | 21.2 | 33 | 147 | Very good | Ex. |

TABLE 3-3-continued

| 46 | 4.0 | 6.4 | 1148 | 18.6 | 33 | 123 | Very good | Ex. |
|---|---|---|---|---|---|---|---|---|
| 47 | 4.2 | 7.5 | 1134 | 16.9 | 25 | 96 | Poor | Comp. ex. |
| 48 | 4.2 | 6.1 | 1172 | 17.0 | 40 | 126 | Very good | Ex. |
| 49 | 4.4 | 6.5 | 1011 | 21.0 | 21 | 97 | Very good | Ex. |
| 50 | 4.5 | 6.6 | 987 | 21.2 | 22 | 98 | Very good | Ex. |
| 51 | 5.0 | 4.5 | 1512 | 8.1 | 51 | 87 | Very good | Ex. |
| 52 | 4.9 | 4.7 | 1530 | 9.0 | 48 | 95 | Very good | Ex. |
| 53 | 5.2 | 4.5 | 1514 | 8.3 | 50 | 89 | Very good | Ex. |
| 54 | 4.7 | 6.8 | 886 | 19.8 | 54 | 129 | Very good | Comp. ex. |
| 55 | 0.8 | 6.5 | 1114 | 19.3 | 32 | 122 | Poor | Comp. ex. |
| 56 | 4.9 | 4.0 | 1331 | 10.2 | 11 | 45 | Poor | Comp. ex. |
| 57 | 3.0 | 6.2 | 748 | 27.9 | 29 | 112 | Very good | Comp. ex. |
| 58 | 4.2 | 6.0 | 1229 | 11.9 | 9 | 44 | Poor | Comp. ex. |
| 59 | 5.1 | 6.6 | 1278 | 21.1 | 8 | 76 | Poor | Comp. ex. |
| 60 | 1.0 | 6.1 | 951 | 18.4 | 23 | 84 | Poor | Comp. ex. |
| 61 | 1.2 | 6.0 | 1123 | 16.7 | 35 | 111 | Poor | Comp. ex. |

Bold underlines show outside ranges of present invention

Comparative Examples 3 and 4 had temperatures of the second soaking treatment in the hot dip galvanization step lower than 480° C. or holding times of the second soaking treatment of less than 80 seconds. As a result, the concentrations of the solid solution B at the prior austenite grain boundaries became less than 2.0 atm % and hydrogen embrittlement resistances were poor. Comparative Example 5 had a temperature of the third soaking treatment at the hot dip galvanization step was higher than 420° C. As a result, the desired metallic structure was not obtained and press formability was poor. Comparative Example 9 had a holding time of the second soaking treatment in the hot dip galvanization step of more than 500 seconds. As a result, the desired metallic structure was not obtained and press formability was poor. Comparative Example 11 had a dwell time of $T_B$ or less in the hot rolling step of more than 300 seconds. As a result, the concentration of the solid solution B at the prior austenite grain boundaries becomes less than 2.0 atm % and the hydrogen embrittlement resistance was poor. Comparative Example 12 had an average cooling rate from the finish rolling exit side temperature to 800° C. in the hot rolling step of less than V° C./s. As a result, the concentration of the solid solution B of the prior austenite grain boundaries became less than 2.0 atm % and the hydrogen embrittlement resistance was poor. Comparative Example 17 had a temperature of the second soaking treatment at the hot dip galvanization step of more than 600° C. As a result, the desired metallic structure was not obtained, the concentration of solid solution B at the prior austenite grain boundaries became less than 2.0 atm %, and the press formability and hydrogen embrittlement resistance were poor. Comparative Example 20 had a temperature of the first soaking temperature in the hot dip galvanization step which was less than the lower limit prescribed in the present invention, so was less than Ac1+30° C. As a result, the desired metallic structure was not obtained and press formability was poor.

Comparative Examples 25 and 26 had temperatures of the third soaking treatment at the hot dip galvanization step of less than 200° C. or the holding times of the third soaking treatment of less than 5 seconds. As a result, the desired metallic structures were not obtained and the press formabilities and hydrogen embrittlement resistances were poor. Comparative Example 30 had an average cooling rate of the first cooling in the hot dip galvanization step of less than 10° C./s. As a result, the desired metallic structure was not obtained and press formability was poor. Comparative Example 31 had a temperature in the alloying treatment in the hot dip galvanization step of more than 600° C. As a result, the desired metallic structure was not obtained and press formability was poor. Comparative Example 34 had a finish rolling inlet side temperature and finish rolling exit side temperature at the hot rolling step of more than 1050° C. and more than 1000° C. As a result, the average effective crystal grain size of the metallic structure was more than 7.0 µm and the hydrogen embrittlement resistance was poor. Comparative Example 36 had an average heating rate in the hot dip galvanization step of less than 0.5° C./s, had an average effective crystal grain size of the metallic structure becoming more than 7.0 µm, and had a hydrogen embrittlement resistance which was poor. Comparative Example 47 had a total rolling reduction of the finish rolling in the hot rolling step of less than 70%. As a result, the average effective crystal grain size of the metallic structure became more than 7.0 µm and the hydrogen embrittlement resistance was poor. Comparative Examples 54 to 60 had chemical compositions not controlled to within the predetermined ranges, so the press formabilities and/or hydrogen embrittlement resistances were poor. Comparative Example 61 had a coiling temperature at the hot rolling step was more than 680° C. As a result, the concentration of the solid solution B at the prior austenite grain boundaries became less than 2.0 atm % and the hydrogen embrittlement resistance was poor.

In contrast to this, the hot dip galvanized steel sheets of the examples have a tensile strength of 980 MPa or more and TS×El×λ$^{0.5}$/1000 of 80 or more and further have excellent hydrogen embrittlement resistance after plastic deformation, so it is learned that they are excellent in press formability and hydrogen embrittlement resistance after plastic forming.

Example B

In this example, the inventors studied the presence or absence of a specific soaking treatment. First, they prepared a slab having the chemical composition shown in Table 1, then, as shown in Table 4, made the first cooling gradual cooling to eliminate the second soaking treatment. Other than that, the same procedure was followed as the case of Example A to obtain hot dip galvanized steel sheet. The steel structures and mechanical properties in the obtained hot dip galvanized steel sheet were investigated by methods similar to the case of Example A. The results are shown in Table 5. In the different soaking treatments shown in Table 4, the temperature was maintained within a range of the temperature shown in Table 4±10° C.

TABLE 4

| | | | | | Hot rolling step | | | | | | |
|---|---|---|---|---|---|---|---|---|---|---|---|
| No. | Steel type | Slab heating temp. ° C. | $T_B$ ° C. | Dwell time at $T_B$ or less s | Total rolling reduction of rough rolling at 1050° C. or more % | Finish inlet side temp. ° C. | Finish exit side temp. ° C. | Finish rolling total rolling reduction % | V ° C./s | Cooling rate from finish exit side to 800° C. ° C./s | Coiling temp. ° C. | Cold rolling step Cold rolling reduction % |
| 62 | A | 1220 | 1064 | 23 | 84 | 1050 | 900 | 92 | 3.9 | 5.5 | 580 | 53 |

| | Hot dip galvanization step | | | | | | | | |
|---|---|---|---|---|---|---|---|---|---|
| | Heating Heating rate from 650° C. to maximum heating temp. ° C./s | First soaking treatment | | First cooling | | Alloying treatment | Third soaking treatment | | Ms at hot dip galvanization step ° C. |
| No. | | Temp. ° C. | Holding time s | Cooling rate ° C./s | Cooling step temp. ° C. | Alloying temp. ° C. | Temp. ° C. | Holding time s | |
| 62 | 1.4 | 850 | 90 | 1 | 250 | 520 | 380 | 330 | 348 |

Bold underlines show outside ranges of present invention.

TABLE 5

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 62 | A | GA | 30 | 7 | 28 | 7 | 3 | 25 |

| | Microstructure | | Mechanical properties | | | | | | |
|---|---|---|---|---|---|---|---|---|---|
| | Former γ grain boundary B conc. atm % | Average effective grain size μm | Press formability | | | | | Hydrogen embrittlement resistance | Remarks |
| No. | | | TS MPa | El % | λ % | λ$^{0.5}$/ 1000 | TS*El* embrittlement resistance | | |
| 62 | 1.5 | 4.6 | 1128 | 15.7 | 32 | 100 | Poor | | Comp. ex. |

Bold underlines show outside ranges of present invention.

As clear from the results of Table 5, if making the first cooling gradual cooling to eliminate second soaking treatment, the concentration of the solid solution B at the prior austenite grain boundaries became less than 2.0 atm % and the hydrogen embrittlement resistance was poor.

Example C

In the example, the relationship between the soaking treatment and the coating treatment was studied in the same way. First, a slab having the chemical composition shown in Table 1 was prepared. Next, as shown in Table 6, except for performing the coating and alloying treatment not after the second soaking treatment but after the third soaking treatment, the same procedure was followed to obtain hot dip galvanized steel sheets. The steel structures and mechanical properaties in the obtained hot dip galvanized steel sheet were investigated by methods similar to the case of Example A. The results are shown in Table 7. In the soaking treatments shown in Table 6, the temperature was maintained in the range of the temperature shown in Table 6±10° C.

TABLE 6

| | | | | Hot rolling step | | | | | | | |
|---|---|---|---|---|---|---|---|---|---|---|---|
| No. | Steel type | Slab heating temp. ° C. | $T_B$ ° C. | Dwell time at $T_B$ o' less s | Total rolling reduction of rough rolling at 1050° C. or more % | Finish inlet side temp. ° C. | Finish exit side temp. ° C. | Finish rolling total rolling reduction % | V ° C./s | Cooling rate from finish exit side to 800° C. ° C./s | Coiling temp. ° C. | Cold rolling step Cold rolling reduction % |
| 64 | B | 1250 | 1006 | 0 | 84 | 1040 | 960 | 92 | 1.6 | 5.0 | 500 | 53 |

| | | Hot dip galvanization step | | | | | | | | | |
|---|---|---|---|---|---|---|---|---|---|---|---|
| No. | Heating Heating rate from 650° C. to maximum heating temp. ° C./s | First soaking treatment Temp. ° C. | First soaking treatment Holding time s | First cooling Cooling rate ° C./s | Second soaking treatment Temp. ° C. | Second soaking treatment Holding time s | Second cooling Cooling stop temp. ° C. | Third soaking treatment Temp. ° C. | Third soaking treatment Holding time s | Alloying treatment Alloying temp. ° C. | Ms at hot dip galvanization step ° C. |
| 64 | 1.8 | 840 | 90 | 25 | 520 | 100 | 250 | 400 | 330 | 560 | 341 |

Bold underlines show outside ranges of present invention.

TABLE 7

| | | | Microstructure | | | | | |
|---|---|---|---|---|---|---|---|---|
| No. | Steel type | Coating | Ferrite % | Retained austenite % | Tempered martensite % | Fresh martensite % | Pearlite + cementite % | Bainite % |
| 64 | B | GA | 33 | 4 | 20 | 8 | 6 | 29 |

| | Microstructure Former γ grain boundary B concentration atm % | Average effective grain size μm | Mechanical properties | | | | | |
|---|---|---|---|---|---|---|---|---|
| No. | | | TS MPa | El % | λ % | TS*El* $λ^{0.5}$/ 1000 | Hydrogen embrittlement resistance | Remarks |
| 64 | 2.2 | 3.4 | 922 | 18.8 | 20 | 78 | Very good | Comp. ex. |

Bold underlines show outside ranges of present invention.

As clear from the results of Table 7, if performing coating alloying treatment after the third soaking treatment, the desired metallic structure could not be obtained and the press formability was poor.

The invention claimed is:

1. A hot dip galvanized steel sheet comprising a base steel sheet and a hot dip galvanized layer on at least one surface of the base steel sheet, wherein the base steel sheet has a chemical composition comprising, by mass %, C: 0.050% to 0.350%,
Si: 0.10% to 2.50%,
Mn: 1.00% to 3.50%,
P: greater than 0% to 0.050%,
S: greater than 0% to 0.0100%,
Al: 0.001% to 1.500%,
N: greater than 0% to 0.0100%,
O: greater than 0% to 0.0100%,
Ti: 0.005% to 0.200%,
B: 0.0005% to 0.0100%,
V: 0% to 1.00%,
Nb: 0% to 0.100%,
Cr: 0% to 2.00%,
Ni: 0% to 1.00%,
Cu: 0% to 1.00%,
Co: 0% to 1.00%,
Mo: 0% to 1.00%,
W: 0% to 1.00%,
Sn: 0% to 1.00%,
Sb: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM other than Ce and La: 0% to 0.0100% and
a balance of Fe and impurities,
a steel microstructure at a range of ⅛ thickness to ⅜ thickness centered about a position of ¼ thickness from a surface of the base steel sheet contains, by volume fraction,
ferrite: 0% to 50%,
retained austenite: 6% to 30%
tempered martensite: 5% or more,
fresh martensite: 0% to 10%, and
pearlite and cementite in total: 0% to 5%,
when there are remaining structures, the remaining structures comprise bainite,
a concentration of B atoms at prior austenite grain boundaries is 2.0 atm % or more, and an average effective crystal grain size is 7.0 μm or less.

* * * * *